(12) United States Patent (10) Patent No.: US 12,573,175 B2

Li (45) Date of Patent: Mar. 10, 2026

(54) TARGET TRACKING METHOD, TARGET TRACKING SYSTEM AND ELECTRONIC DEVICE

(71) Applicant: BOE TECHNOLOGY GROUP CO., LTD., Beijing (CN)

(72) Inventor: Fei Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 324 days.

(21) Appl. No.: 18/268,374

(22) PCT Filed: Jun. 1, 2022

(86) PCT No.: PCT/CN2022/096635
§ 371 (c)(1),
(2) Date: Jun. 20, 2023

(87) PCT Pub. No.: WO2023/230959
PCT Pub. Date: Dec. 7, 2023

(65) Prior Publication Data
US 2024/0371126 A1 Nov. 7, 2024

(51) Int. Cl.
*G06V 10/00* (2022.01)
*G06V 10/75* (2022.01)
*G06V 10/82* (2022.01)

(52) U.S. Cl.
CPC ............ *G06V 10/751* (2022.01); *G06V 10/82* (2022.01)

(58) Field of Classification Search
CPC ......... G06V 10/751; G06V 10/82; G06T 7/20
See application file for complete search history.

(56) References Cited

U.S. PATENT DOCUMENTS

2015/0104066 A1 4/2015 Shellshear
2021/0090284 A1* 3/2021 Ning ..................... G06V 40/23

FOREIGN PATENT DOCUMENTS

CN 101895685 A 11/2010
CN 106980841 A 7/2017
(Continued)

OTHER PUBLICATIONS

Xiong et al., A Structured Learning-Based Graph Matching Method for Tracking Dynamic Multiple Objects, IEEE Transactions on Circuits and Systems for Video Technology, vol. 23, Issue: 3, March (Year: 2013).*

(Continued)

*Primary Examiner* — Xiao Liu
(74) *Attorney, Agent, or Firm* — HOUTTEMAN LAW LLC

(57) ABSTRACT

A target tracking method, including: performing first and second part recognitions in a current frame, to obtain recognition boxes of the first and second parts, respectively; performing a matching between the recognition boxes of the first and second parts, to obtain a first matching result, and determining a box to be tracked of the second part of a recognized target in the current frame, according to the first matching result; and performing a matching between a first multi-target tracking model of a previous frame and a respective box to be tracked of the second part in the current frame, to obtain a second matching result, and determining a target tracking result of the current frame according to the second matching result, where the first multi-target tracking model of the previous frame includes main trackers of a plurality of targets to be tracked in the previous frame.

18 Claims, 7 Drawing Sheets

(56)　　　　　References Cited

FOREIGN PATENT DOCUMENTS

| CN | 110070005 | A | | 7/2019 | | |
|----|-----------|---|---|--------|---|---|
| CN | 110852219 | A | | 2/2020 | | |
| CN | 111444850 | A | | 7/2020 | | |
| CN | 111460884 | A | | 7/2020 | | |
| CN | 112036345 | A | | 12/2020 | | |
| CN | 112037247 | A | * | 12/2020 | .............. | G06T 7/70 |
| CN | 112131904 | A | * | 12/2020 | ............ | G06V 20/46 |
| CN | 112784680 | A | | 5/2021 | | |
| CN | 113496200 | A | | 10/2021 | | |
| CN | 113838092 | A | | 12/2021 | | |
| CN | 114548214 | A | | 5/2022 | | |
| CN | 112215155 | B | | 10/2022 | | |

OTHER PUBLICATIONS

Zhu, "Research on early warning system of city appearance violations and people flow in streets based on intelligent video analysis," Master's Thesis, Mar. 15, 2021, Nanjing University of Posts and Telecommunications, Nanjing, China.

* cited by examiner

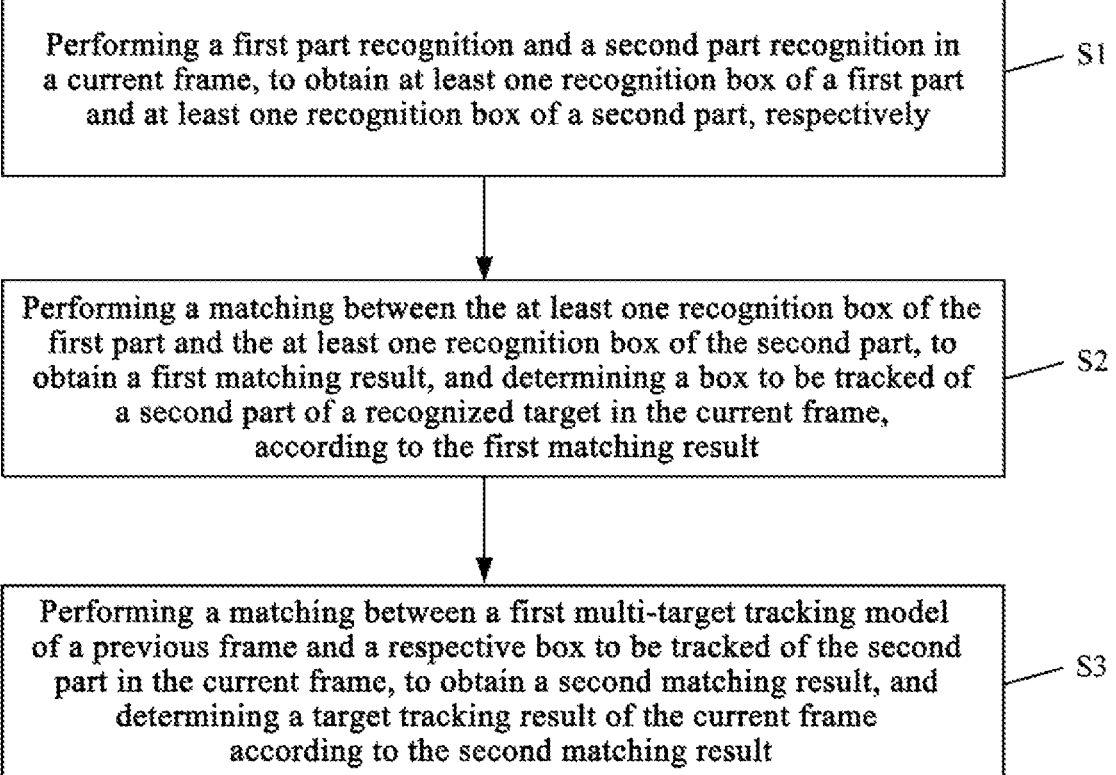

Performing a first part recognition and a second part recognition in a current frame, to obtain at least one recognition box of a first part and at least one recognition box of a second part, respectively ⟶ S1

Performing a matching between the at least one recognition box of the first part and the at least one recognition box of the second part, to obtain a first matching result, and determining a box to be tracked of a second part of a recognized target in the current frame, according to the first matching result ⟶ S2

Performing a matching between a first multi-target tracking model of a previous frame and a respective box to be tracked of the second part in the current frame, to obtain a second matching result, and determining a target tracking result of the current frame according to the second matching result ⟶ S3

FIG. 1

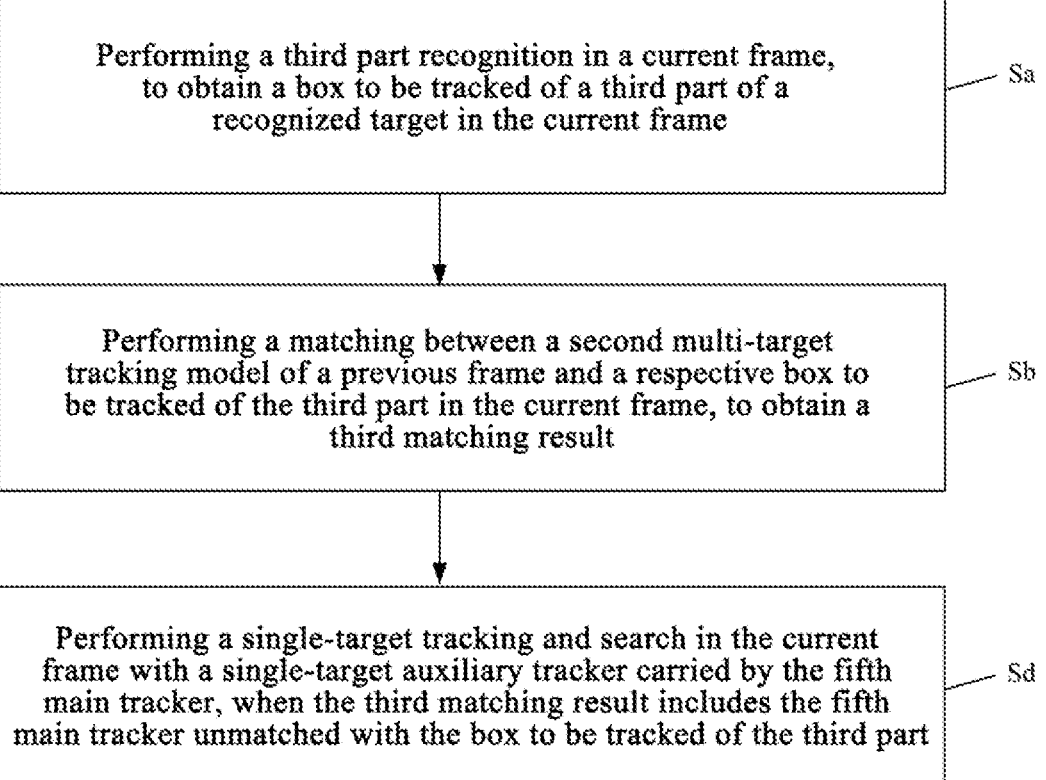

Performing a third part recognition in a current frame, to obtain a box to be tracked of a third part of a recognized target in the current frame —— Sa Performing a matching between a second multi-target tracking model of a previous frame and a respective box to be tracked of the third part in the current frame, to obtain a third matching result —— Sb Performing a single-target tracking and search in the current frame with a single-target auxiliary tracker carried by the fifth main tracker, when the third matching result includes the fifth main tracker unmatched with the box to be tracked of the third part —— Sd

FIG. 6

Model training module — 30

Recognition module — 31

Determination module for box to be tracked — 32

Tracking result determination module — 33

I/O interface — 103

Memory — 102

— 104

Processor — 101

TARGET TRACKING METHOD, TARGET TRACKING SYSTEM AND ELECTRONIC DEVICE

TECHNICAL FIELD

The present disclosure relates to the field of computer technology, and in particular to a target tracking method, a target tracking system, and an electronic device.

BACKGROUND

Target detection and tracking is a very important task in computer vision, which can estimate information of targets (e.g., a person, an animal, or an article) within a field of vision, detect and track a single target or multiple targets within the field of vision through input data of sensors.

In the prior art, generally, a certain part (generally, a part with a certain identification degree, such as a face) of a target contained in a video stream is recognized, and the target is tracked based on the recognition results of the part. Taking target tracking based on face recognition as an example, firstly, a face recognition is performed on the target in two sequential frames, then a matching is performed on the face recognition results of the two sequential frames, and the targets corresponding to two successfully matched face recognition boxes in the two sequential frames are marked with a same identifier, so as to realize the tracking of the target. However, when the target turns its head, holds its head down, or hold its head up, the target cannot be recognized by face recognition, or the target is recognized but is difficult to match successfully with the same target in a previous frame, so that the target is required to be re-marked with a new identifier (the number of identifier IDs is abnormally increased), thereby causing the target to be lost.

SUMMARY

In a first aspect, an embodiment of the present disclosure provide a target tracking method, where the target has a second part, and the second part includes a first part and a part other than the first part, and the method includes:

performing a first part recognition and a second part recognition in a current frame, to obtain at least one recognition box of the first part and at least one recognition box of the second part, respectively;

performing a matching between the at least one recognition box of the first part and the at least one recognition box of the second part, to obtain a first matching result, and determining a box to be tracked of the second part of a recognized target in the current frame, according to the first matching result, where the box to be tracked of the second part of the recognized target in the current frame includes the at least one recognition box of the second part and a recognition box obtained from the recognition box of the first part unmatched with the recognition box of the second part, by enlarging a box region of the recognition box of the first part unmatched with the recognition box of the second part; and performing a matching between a first multi-target tracking model of a previous frame and a respective box to be tracked of the second part in the current frame, to obtain a second matching result, and determining a target tracking result of the current frame according to the second matching result, where the first multi-target tracking model of the previous frame includes main trackers of a plurality of targets to be tracked in the previous frame.

In some embodiments, the step of determining a target tracking result of the current frame according to the second matching result includes:

taking the recognized target of the box to be tracked of the second part matched with a first main tracker as a first target to be tracked in the current frame, and setting an identifier of the first target to be tracked as an identifier of the target tracked by the matched first main tracker, in response to that the second matching result includes the first main tracker matched with the box to be tracked of the second part.

In some embodiments, subsequent to the step of setting an identifier of the first target to be tracked as an identifier of the target tracked by the matched first main tracker, the method further includes:

updating the matched first main tracker with the box to be tracked of the second part of the first target to be tracked, and taking the updated first main tracker as the main tracker of the first target to be tracked.

In some embodiments, subsequent to the step of setting an identifier of the first target to be tracked as an identifier of the target tracked by the matched first main tracker, the method further includes:

detecting whether the box to be tracked of the second part matched with the first main tracker is the recognition box of the second part matched with the recognition box of the first part or the recognition box obtained from the recognition box of the first part unmatched with the recognition box of the second part by enlarging a box region thereof, according to the first matching result, in response to that the first main tracker carries a single-target auxiliary tracker;

performing a single-target tracking and search in the current frame with the single-target auxiliary tracker carried by the first main tracker, in response to that the box to be tracked of the second part matched with the first main tracker is not the recognition box of the second part unmatched with the recognition box of the first part and is not the recognition box obtained from the recognition box of the first part unmatched with the recognition box of the second part by enlarging the box region thereof; and initializing the single-target auxiliary tracker with the box to be tracked of the second part matched with the first main tracker, in response to that the single-target tracking and search fails, or the single-target tracking and search succeeds but a first tracking-and-search box obtained by the single-target tracking and search is unmatched with the box to be tracked of the second part matched with the first main tracker.

In some embodiments, after the single-target tracking and search is performed in the current frame with the single-target auxiliary tracker carried by the first main tracker and the single-target tracking and search succeeds, the method further includes:

calculating a first intersection over union between the first tracking-and-search box obtained by the successful single-target tracking and search and the box to be tracked of the second part matched with the first main tracker;

comparing the first intersection over union with a preset threshold of first intersection over union; and recognizing that the first tracking-and-search box is unmatched with the box to be tracked of the second part, in response to that the first intersection over union is less than the threshold of first intersection over union.

In some embodiments, the method further includes: deleting the single-target auxiliary tracker carried by the first main tracker, in response to that the box to be tracked of the second part matched with the first main tracker is the recognition box of the second part matched with the recognition box of the first part, or is the recognition box obtained from the recognition box of the first part unmatched with the recognition box of the second part by enlarging a box region thereof.

In some embodiments, the step of determining a target tracking result of the current frame according to the second matching result includes:

detecting whether the box to be tracked of the second part unmatched with the main tracker exists in the second matching result, in response to that the second matching result includes a second main tracker unmatched with the box to be tracked of the second part; and recognizing that the target tracked by the second main tracker does not appear in the current frame, in response to that the box to be tracked of the second part unmatched with the main tracker does not exist in the second matching result.

In some embodiments, the method further includes: detecting whether the second main tracker carries a single-target auxiliary tracker, in response to that the box to be tracked of the second part unmatched with the main tracker exists in the second matching result;

creating a single-target auxiliary tracker for the second main tracker, according to the box to be tracked of the second part of the target tracked by the second main tracker in the previous frame, and performing a single-target tracking and search in the current frame with the single-target auxiliary tracker carried by the second main tracker, in response to that the second main tracker does not carry the single-target auxiliary tracker; and taking a recognized target of the box to be tracked of the second part matched with the second tracking-and-search box as a second target to be tracked in the current frame, and setting an identifier of the second target to be tracked to be an identifier of the target tracked by the second main tracker followed by the single-target auxiliary tracker obtaining the matched second tracking-and-search box, in response to that the single-target tracking and search succeeds and the obtained second tracking-and-search box is matched with one box to be tracked of the second part unmatched with the main tracker in the second matching result.

In some embodiments, subsequent to the step of setting an identifier of the second target to be tracked to be an identifier of the target tracked by the second main tracker followed by the single-target auxiliary tracker obtaining the matched second tracking-and-search box, the method further includes:

updating the second main tracker followed by the single-target auxiliary tracker obtaining the matched second tracking-and-search box, with the box to be tracked of the second part of the second target to be tracked, and taking the updated second main tracker as the main tracker of the second target to be tracked, where the main tracker of the second target to be tracked carries the single-target auxiliary tracker.

In some embodiments, after the single-target tracking and search is performed in the current frame with the single-target auxiliary tracker carried by the second main tracker and the single-target tracking and search succeeds, the method further includes:

calculating a second intersection over union between the second tracking-and-search box obtained by the successful single-target tracking and search and the respective box to be tracked of the second part unmatched with the main tracker in the second matching result;

comparing a maximum second intersection over union with a preset threshold of second intersection over union; and recognizing that the second tracking-and-search box is matched with the box to be tracked of the second part corresponding to the maximum second intersection over union, in response to that the maximum second intersection over union is greater than or equal to the threshold of second intersection over union.

In some embodiments, in response to that the single-target tracking and search succeeds and the obtained second tracking-and-search box is matched with one box to be tracked of the second part unmatched with the main tracker in the second matching result, the method further includes:

deleting the box to be tracked of the second part matched with the second tracking-and-search box, from the box to be tracked of the second part unmatched with the main tracker in the second matching result.

In some embodiments, prior to the step of creating a single-target auxiliary tracker for the second main tracker, the method further includes:

determining whether a total number of currently existing single-target auxiliary trackers reaches a threshold of maximum number;

performing the step of creating a single-target auxiliary tracker for the second main tracker, in response to that the total number of the currently existing single-target auxiliary trackers does not reach the threshold of maximum number; and recognizing that the target tracked by the second main tracker does not appear in the current frame, in response to that the total number of the single-target auxiliary trackers currently existing reaches the threshold of maximum number.

In some embodiments, subsequent to the step of recognizing that the target tracked by the second main tracker does not appear in the current frame, the method further includes:

determining whether the number of consecutive frames, where the target tracked by the second main tracker does not appear, reaches a preset threshold of number of frames; and deleting the second main tracker, in response to that the number of consecutive frames, where the target tracked by the second main tracker does not appear, reaches the preset threshold of number of frames.

In some embodiments, the single-target auxiliary tracker is a kernelized correlation filter single-target tracker.

In some embodiments, the step of determining a target tracking result of the current frame according to the second matching result includes:

detecting, according to the first matching result, whether the box to be tracked of the second part unmatched with the main tracker in the second matching result is the recognition box of the second part matched with the recognition box of the first part or the recognition box obtained from the recognition box of the first part unmatched with the recognition box of the second part by enlarging a box region thereof, when the box to be tracked of the second part unmatched with the main tracker exists in the second matching result; and taking a recognized target of the box to be tracked of the second part as a third target to be tracked in the current frame, and creating a new identifier for the third target to be tracked, in response to that the box to be tracked of the second part unmatched with the main tracker in the second matching result is the recognition box of the second part matched with the recognition box of the first part or the recognition box obtained from the recognition box of the first part unmatched with the recognition box of the second part by enlarging a box region thereof.

In some embodiments, subsequent to the step of creating a new identifier for the third target to be tracked, the method further includes:

creating a third main tracker for the third target to be tracked.

In some embodiments, prior to the step of performing a first part recognition and a second part recognition in a current frame, the method further includes:

training a first part recognition model for performing the first part recognition and a second part recognition model for performing the second part recognition, based on a Faster RCNN algorithm; and the step of performing a first part recognition and a second part recognition in a current frame includes:

performing the first part recognition on the current frame with the first part recognition model, and performing the second part recognition on the current frame with the second part recognition model.

In some embodiments, the step of performing a matching between the at least one recognition box of the first part and the at least one recognition box of the second part includes:

calculating a third intersection over union between each of the at least one recognition box of the first part and every one of the at least one recognition box of the second part; and performing a matching between the recognition box of the first part and the recognition box of the second part with a preset matching algorithm, according to the third intersection over union between each of the at least one recognition box of the first part and every one of the at least one recognition box of the second part.

In some embodiments, the preset matching algorithm includes a maximum weight bipartite graph matching algorithm.

In some embodiments, prior to the step of performing a matching between the at least one recognition box of the first part and the at least one recognition box of the second part with the maximum weight bipartite graph matching algorithm, the method further includes:

resetting the calculated third intersection over union less than a threshold of third intersection over union to 0;

or, subsequent to the step of performing a matching between the at least one recognition box of the first part and the at least one recognition box of the second part with the maximum weight bipartite graph matching algorithm, the method further includes:

canceling a match between the recognition box of the first part and the recognition box of the second part, which have the third intersection over union less than the preset threshold of third intersection over union, in a matching result obtained after performing the matching processing with the maximum weight bipartite graph matching algorithm.

In some embodiments, the step of performing a matching between a first multi-target tracking model of a previous frame and a respective box to be tracked of the second part in the current frame includes:

predicting a prediction box of the tracked target in the current frame according to the main tracker, for the main tracker of each target to be tracked in the previous frame, and performing a matching operation between the prediction box and the respective box to be tracked of the second part.

In some embodiments, the first multi-target tracking model is a simple online and realtime tracking model, and the main tracker is a Kalman filter tracker.

In some embodiments, the first part is a face, and the second part is a head or an upper body.

In a second aspect, an embodiment of the present disclosure further provides a target tracking system, the target has a second part including a first part and a part other than the first part, and the system includes:

a recognition module, configured to perform a first part recognition and a second part recognition in a current frame, to obtain at least one recognition box of the first part and at least one recognition box of the second part, respectively;

a determination module for a box to be tracked, configured to perform a matching between the at least one recognition box of the first part and the at least one recognition box of the second part, to obtain a first matching result, and determine a box to be tracked of the second part of a recognized target in the current frame, according to the first matching result, where the box to be tracked of the second part of the recognized target in the current frame includes the at least one recognition box of the second part and a recognition box obtained from the recognition box of the first part unmatched with the recognition box of the second part, by enlarging a box region of the recognition box of the first part unmatched with the recognition box of the second part; and a tracking result determination module, configured to perform a matching between a first multi-target tracking model of a previous frame and a respective box to be tracked of the second part in the current frame, to obtain a second matching result, and determine a target tracking result of the current frame according to the second matching result, where the first multi-target tracking model of the previous frame includes main trackers of a plurality of targets to be tracked in the previous frame.

In a third aspect, an embodiment of the present disclosure further provides an electronic device, including:

one or more processors; and a memory for storing one or more programs which, when being executed by the one or more processors, cause the one or more processors to implement any one of the target tracking methods in the first aspect.

BRIEF DESCRIPTION OF DRAWINGS

FIG. 1 is a flowchart of a target tracking method according to an embodiment of the present disclosure;

FIG. 6 is a flowchart of another target tracking method according to an embodiment of the present disclosure;

DETAIL DESCRIPTION OF EMBODIMENTS

Figure 2:
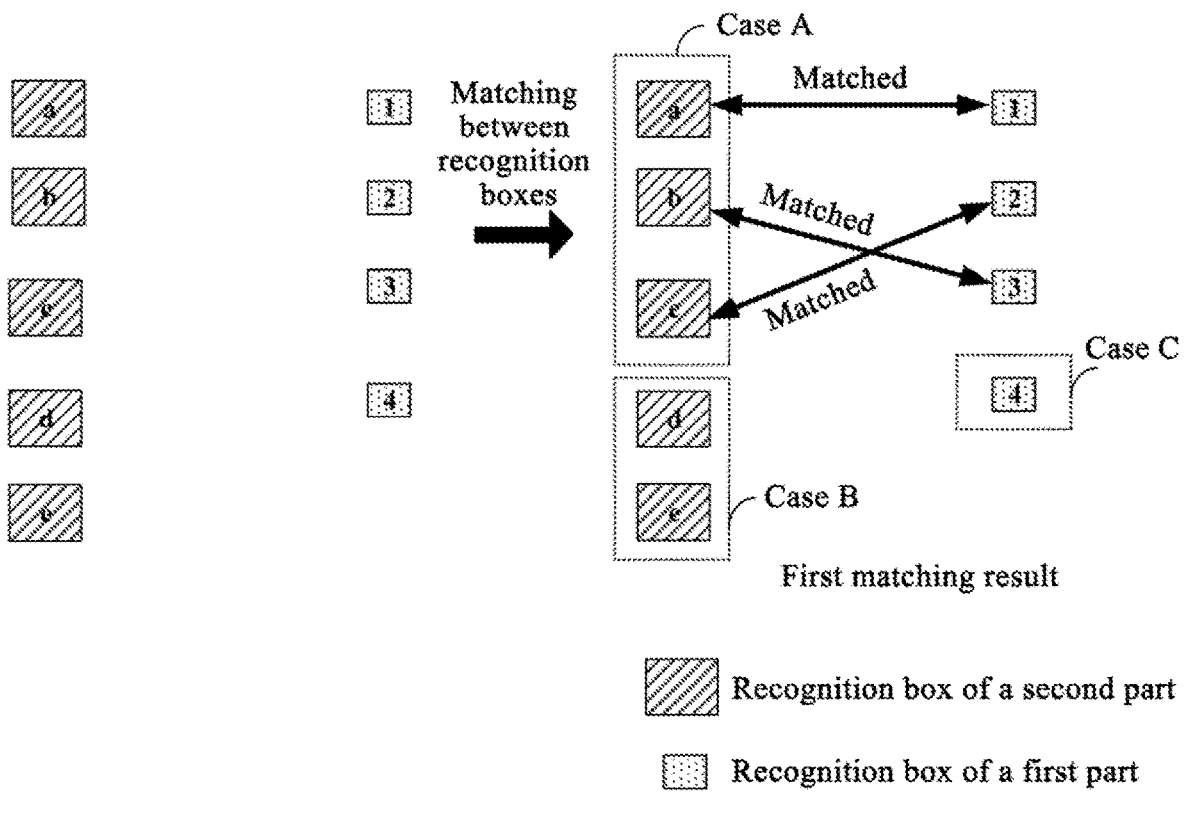
FIG. 2 is a schematic diagram illustrating how to perform a matching between a recognition box of a first part and a recognition box of a second part in an embodiment of the present disclosure.

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which the present disclosure belongs. The use of "first", "second", and the like in the present disclosure is not intended to indicate any order, quantity, or importance, but rather serves to distinguish one element from another. Also, the term "a", "an", "the" or the like does not denote a limitation of quantity, but rather denotes the presence of at least one. The word "comprising", "comprises", or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

Through research, it is found that, when a target is tracked based on recognition result of a single part of the target in the related art, it is difficult to effectively recognize the target in a video frame (the success rate of recognizing the target is low), and it is difficult to establish a matching relationship between the targets in adjacent video frames, so that the number of identifier IDs for marking the target is abnormally increased, and the stability of target tracking is poor. In view of at least one of the technical problems in the related art, the present disclosure provides a target tracking method, a target tracking system, and an electronic device.

FIG. 1 is a flowchart of a target tracking method according to an embodiment of the present disclosure. The target tracking method may be applied to a target tracking system, which may be implemented in software and/or hardware, and can be generally integrated into an electronic device (e.g., a display device). The electronic device may be a terminal device or a server; the terminal device may be a User Equipment (UE), a mobile device, a user terminal, a cellular phone, a cordless phone, a Personal Digital Assistant (PDA), a handheld device, a computing device, a vehiclemounted device, a wearable device, or the like; and the server may be a cloud server, an edge server, or the like.

Referring to FIG. 1, the target tracking method according to an embodiment of the present disclosure includes the following steps S1 to S3.

Step S1, performing a first part recognition and a second part recognition in a current frame, to obtain at least one recognition box of a first part and at least one recognition box of a second part, respectively.

Step S2, performing a matching between the at least one recognition box of the first part and the at least one recognition box of the second part, to obtain a first matching result, and determining a box to be tracked of a second part of a recognized target in the current frame, according to the first matching result, where the box to be tracked of the second part of the recognized target in the current frame includes the at least one recognition box of the second part and a recognition box obtained from the recognition box of the first part unmatched with the recognition box of the second part, by enlarging a box region thereof.

Step S3, performing a matching between a first multi-target tracking model of a previous frame and a respective box to be tracked of the second part in the current frame, to obtain a second matching result, and determining a target tracking result of the current frame according to the second matching result, where the first multi-target tracking model of the previous frame includes main trackers of a plurality of targets to be tracked in the previous frame.

The target tracking method according to the embodiment of the present disclosure can be used for recognizing a target in a video frame contained in a video stream. The video stream may include a plurality of video frames, and each of the plurality of video frames has a timestamp for indicating a capture time of the video frame. There may be a certain time interval between any two adjacent video frames, for example, when a frame rate is 20 frames per second, the time interval between any two adjacent video frames is 0.05 second. The target being tracked in the video frame may be a person, an animal, an article, or the like. The target has a second part, the second part includes a first part and a part other than the first part (for a same target, a size of the second part is greater than that of the first part). That is, the first part and the second part of the same target are associated and can be matched with each other.

As an example, the target may be an animal or a person, the first part is a face, and the second part is a head or an upper body. As another example, the target may be an automobile, the first part a license plate, and the second part is a head of the automobile, a tail of the automobile, or the whole automobile.

In practical applications, the specific parts referred to by the first part and the second part may be set as required.

It should be noted that, when processing a first frame in a video stream, the first part recognition and the second part recognition may be performed on the first frame, to obtain at least one recognition box of the first part and at least one recognition box of the second part in the first frame, respectively. Then, a matching is performed between the at least one recognition box of the first part and the at least one recognition box of the second part in the first frame, to obtain a corresponding matching result, and a recognized target in the first frame and a box to be tracked of the second part corresponding to the recognized target are determined according to the matching result. The recognized target in the first frame includes a target corresponding to a recognition box of the second part in the first frame and a target corresponding to a recognition box of the first part unmatched with the recognition box of the second part in the first frame. The box to be tracked of the second part corresponding to the recognized target in the first frame includes the recognition box of the second part in the first frame and an recognition box obtained from the recognition box of the first part unmatched with the recognition box of the second part (if the recognition box of the first part unmatched with the recognition box of the second part does not exist, the box to be tracked of the second part includes only the recognition box of the second part), by enlarging a box region thereof (a specific enlarging manner and a size of the box region after enlarging may be preset according to actual needs). Then, the recognized target in the first frame is taken as a target to be tracked in the first frame, and a first multi-target tracking model of the first frame is created according to the boxes to be tracked of the second part corresponding to respective targets to be tracked, where the first multi-target tracking model of the first frame includes main trackers of a plurality of targets to be tracked in a previous frame, and each of the trackers includes information such as an identifier, a position and prediction parameters of the tracked target.

In the process of processing a second frame and subsequent frames, the target tracking in the current frame and the determination of the target tracking result of the current frame may be performed through the above steps S1 to S3, and the first multi-target tracking model of a previous frame is updated to obtain the first multi-target tracking model of the current frame (when the target tracking is performed on the last frame of the video stream, the first multi-target tracking model of the second-to-last frame may not be updated in principle).

The target tracking result of the current frame in the embodiment of the present disclosure includes an identifier and a position of the target to be tracked in the current frame.

In the technical solution of the present disclosure, a first part and a second part associated with each other in a current frame are each recognized, a matching is performed between recognition boxes obtained by recognizing the two parts to obtain a first matching result, and then a recognized target in the current frame and a box to be tracked of the second part corresponding to a respective recognized target are determined based on the first matching result, where the recognized target in the current frame includes a target corresponding to the recognition box of the second part in the current frame and a target corresponding to the recognition box of the first part unmatched with the recognition box of the second part in the current frame, and the box to be tracked of the second part of the recognized target in the current frame includes the recognition box of the second part in the current frame and a recognition box obtained from the recognition box of the first part unmatched with the recognition box of the second part, by enlarging a box region thereof (a specific enlarging manner and a size of the box region after enlarging may be preset according to actual needs). Therefore, in the technical solution of the present disclosure, the target in the current frame can be recognized through not only the first part recognition but also the second part recognition, so that the target in the video frame can be effectively recognized, and a success rate of recognizing the target can be improved. In addition, a matching is performed between the first multi-target tracking model of the previous frame and a respective box to be tracked of the second part in the current frame, so that the matching relation between the targets to be tracked in the adjacent video frames can be effectively established, which is favorable to improve the stability of target tracking, such that it can effectively solve the problem that the number of identifier IDs for marking the targets to be tracked is abnormally increased.

In some embodiments, prior to step S1, the method further includes: training a first part recognition model for performing the first part recognition and a second part recognition model for performing the second part recognition, based on a Faster RCNN algorithm. In this case, step S1 specifically includes: performing the first part recognition on the current frame with the first part recognition model, and performing the second part recognition on the current frame with the second part recognition model.

In the related art, a YOLO (You Only Look Once) series algorithm is generally used to train a recognition model for recognizing a certain part. However, the YOLO series algorithm cannot effectively distinguish two different recognition boxes with close center points and great intersection. In the embodiment of the present disclosure, since the first part is a part of the second part (for example, the first part is a face, the second part is a head, and the face is a part of the head), a distance between the center points of the two parts is low, and an intersection over union between the corresponding recognition boxes is great. Therefore, if a first part recognition model for performing the first part recognition and a second part recognition model for performing the second part recognition are trained with the YOLO series algorithm, recognition results obtained after the first part recognition and the second part recognition are performed on the same frame with the two recognition models, respectively are substantially identical (the two recognition models cannot effectively distinguish the first part from the second part), so that it is difficult to satisfy the requirements for dual recognition of the first part recognition and the second part recognition in the present disclosure.

In the present disclosure, a first part recognition model for performing first part recognition and a second part recognition model for performing second part recognition are each trained from a Resenet50 base network with a Faster RCNN algorithm, and the trained first part recognition model and the trained second part recognition model can effectively distinguish the first part from the second part, so as to meet the requirements for dual recognition of performing the first part recognition and the second part recognition on the video frame in the present disclosure.

FIG. 2 is a schematic diagram illustrating how to perform a matching between a recognition box of the first part and a recognition box of the second part in an embodiment of the present disclosure. As shown in FIG. 2, in some embodiments, the step of performing a matching between at least one recognition box of the first part and at least one recognition box of the second part in step S2 includes: calculating a third intersection over union between each recognition box of the first part and every recognition box of the second part; and performing a matching between the recognition box of the first part and the recognition box of the second part with a preset matching algorithm, according to the third intersection over union between each recognition box of the first part and every recognition box of the second part.

One example of performing a matching between five recognition boxes a to e of the second part and four recognition boxes 1 to 4 of the first part is illustrated in a case shown in FIG. 2. FIG. 2 exemplarily and schematically shows a case where the recognition box a of the second part is matched with the recognition box 1 of the first part, the recognition box b of the second part is matched with the recognition box 3 of the first part, and the recognition box c of the second part is matched with the recognition box 2 of the first part.

Optionally, the above preset matching algorithm includes a maximum weight bipartite graph matching algorithm (also referred to as Kuhn-Munkres algorithm).

According to the third intersection over union between each recognition box of the first part and every recognition box of the second part, with the maximum weight bipartite graph matching algorithm, it can effectively and accurately determine the recognition box of the second part matched with the recognition box of the first part (hereinafter, described as case A), the recognition box of the second part unmatched with the recognition box of the first part (hereinafter, described as case B), and the recognition box of the first part unmatched with the recognition box of the second part (hereinafter, described as case C).

In some embodiments, prior to the step of performing a matching between the recognition box of the first part and the recognition box of the second part with a maximum weight bipartite graph matching algorithm, the method further includes: resetting the calculated third intersection over union less than a threshold of third intersection over union to 0 (referred to as a preprocessing process for short).

In other embodiments, subsequent to the step of performing a matching between the recognition box of the first part and the recognition box of the second part with the maximum weight bipartite graph matching algorithm, the method further includes: canceling a match between the recognition box of the first part and the recognition box of the second part, which have the third intersection over union less than a preset threshold of third intersection over union (referred to a screening process for short), in a matching result obtained after performing the matching processing with the maximum weight bipartite graph matching algorithm.

Through the preprocessing process or the screening process described above, it can be ensured that the intersection over union between the recognition box of the first part and the recognition box of the second part matched with each other is always greater than the threshold of third intersection over union, so that the matching reliability is ensured.

Figure 3:
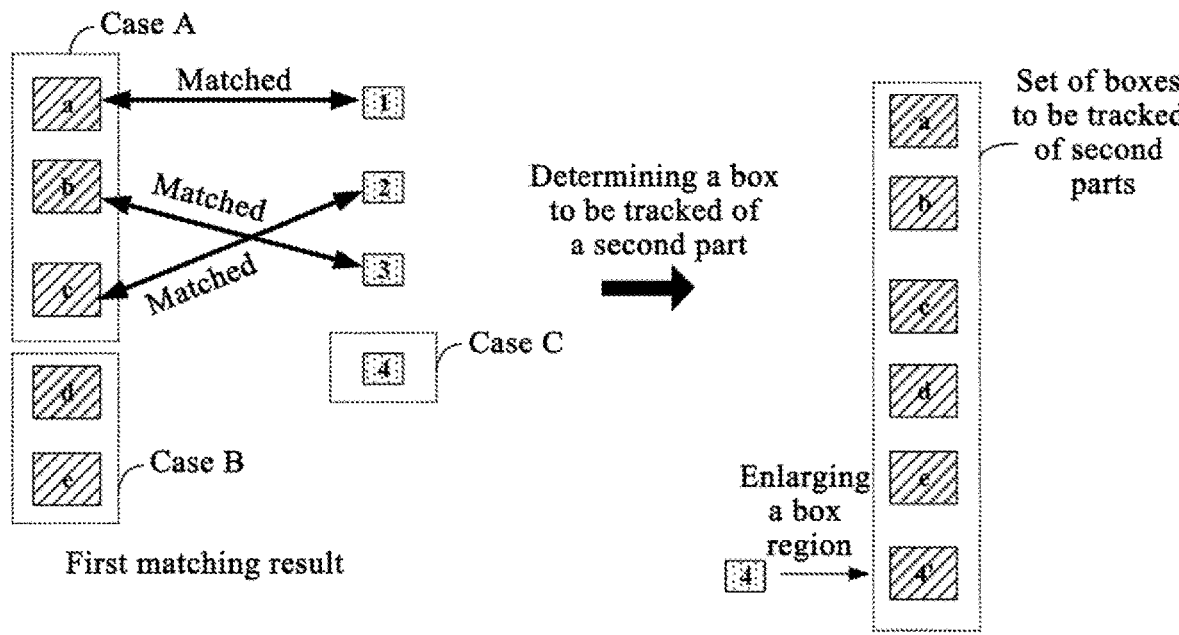
FIG. 3 is a schematic diagram illustrating how to determine a box to be tracked of a second part of a recognized target in a current frame according to a first matching result in an embodiment of the present disclosure.

FIG. 3 is a schematic diagram illustrating how to determine a box to be tracked of a second part of a recognized target in a current frame according to the first matching result in an embodiment of the present disclosure. As shown in FIG. 3, the box to be tracked of the second part of the recognized target in the current frame may be determined according to the first matching result in FIG. 2. At this time, the obtained box to be tracked of the second part of the recognized target includes all the recognition boxes a to e of the second part and the recognition box 4' obtained by performing the box region enlarging processing on the recognition box 4 of the first part, unmatched with the recognition box of the second part.

It should be noted that, when the first matching result shows that there is no recognition box of the first part unmatched with the recognition box of the second part, the box to be tracked of the second part includes only all the recognition boxes of the second part.

In some embodiments, the step S3 of performing a matching between the first multi-target tracking model of the previous frame and a respective box to be tracked of the second part in the current frame includes: for the main tracker of each target to be tracked in the previous frame, predicting a prediction box of the tracked target in the current frame according to the main tracker, and performing a matching between the prediction box and every box to be tracked of the second part.

In some embodiments, the first multi-target tracking model is a Simple Online And Realtime Tracking (SORT) model, and the main tracker is a Kalman filter tracker. A state model X of the target tracked by the Kalman filter tracker may be represented as follows:

$$X=[u,v,s,r,u',v',s'],$$

where u and v represent a horizontal coordinate and a vertical coordinate of a central point of a box to be tracked of a second part of the tracked target, respectively, s and r represent a size (an area) and an aspect ratio (a ratio of a length in the vertical direction to a length in the horizontal direction) of the box to be tracked of the second part of the tracked target, respectively, and u', v' and s' represent three velocity components of the box to be tracked of the second part of the tracked target, respectively. Among them, u, v may represent a position of the tracked target, and s, r, u', v', s' may represent prediction parameters of the tracked target. Generally, values of u', v', and s' in the main tracker of each target to be tracked in a first frame are each 0, and values of u', v', and s' change correspondingly after the SORT model is subsequently updated.

The matching process between the Kalman filter tracker (main tracker) of the target to be tracked in the previous frame and the box to be tracked of the second part in the current frame is performed as follows: firstly, predicting a prediction box of the tracked target in the current frame with the Kalman filtering tracker; then, performing an association matching operation with the weighted Hungarian matching algorithm between the prediction box and every box to be tracked of the second part in the current frame; if a certain association matching operation result meets a preset matching success condition, determining that the Kalman filtering tracker is matched with the corresponding box to be tracked of the second part; and if the association matching operation result does not meet the preset matching success condition, determining that the Kalman filtering tracker is unmatched with the second part to be tracked in the current frame.

Optionally, the prediction box obtained by the main tracker in the SORT model is used as background content (generally not presented at a front end) for an auxiliary judgment, and is used for performing association matching operation between the prediction box and the box to be tracked of the second part (determining the matched box to be tracked of the second part by calculating an intersection over union), and the front end still presents the box to be tracked of the second part.

It should be noted that the SORT model has a relatively fast operation speed, and is very suitable for the technical solution of the present disclosure. Alternatively, the technical solution of the present disclosure may employ other first multi-target tracking models (for example, DeepSORT model), which is not limited by the technical solution of the present disclosure.

Figure 4:
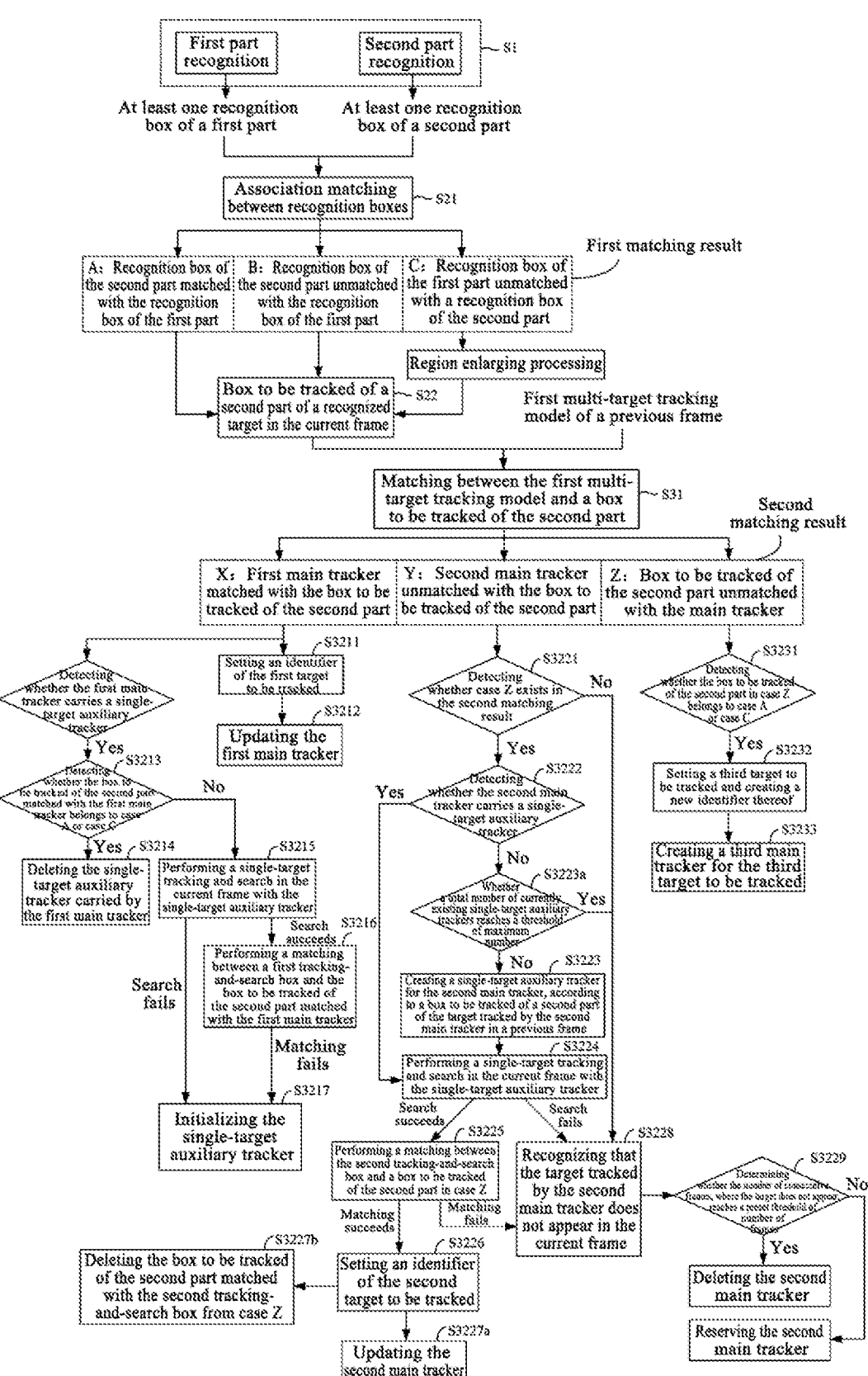
FIG. 4 is a flowchart of another target tracking method according to an embodiment of the present disclosure.

FIG. 4 is a flowchart of another target tracking method according to an embodiment of the present disclosure. As shown in FIG. 4, the target tracking method is a specific optional implementation of the target tracking method shown in FIG. 1, and the target tracking method includes the following step S1 to S32.

Step S1, performing a first part recognition and a second part recognition in a current frame, to obtain at least one recognition box of a first part and at least one recognition box of a second part, respectively.

Step S21, performing a matching between the at least one recognition box of the first part and the at least one recognition box of the second part, to obtain a first matching result.

In step S21, the first matching result includes at least one of the following three cases.

Case A: there is a recognition box of the second part matched with the recognition box of the first part;

Case B: there is a recognition box of the second part unmatched with the recognition box of the first part; and Case C: there is a recognition box of the first part unmatched with a recognition box of the second part.

Step S22, determining a box to be tracked of a second part of a recognized target in the current frame, according to the first matching result.

The box to be tracked of the second part of the recognized target in the current frame includes the recognition box of the second part (the recognition boxes of the second part in case B and case B) and a recognition box obtained from the recognition box of the first part unmatched with the recognition box of the second part (the recognition box of the first part in case C), by enlarging a box region thereof.

Step S31, performing a matching between a first multi-target tracking model of a previous frame and a respective box to be tracked of the second part in the current frame, to obtain a second matching result.

The second matching result includes at least one of the following three cases.

Case X: there is a main tracker matched with the box to be tracked of the second part (referred to as a first main tracker);

Case Y: there is a main tracker unmatched with the box to be tracked of the second part (referred to as a second main tracker);

Case Z: there is a box to be tracked of the second part unmatched with the main tracker.

Figure 5:
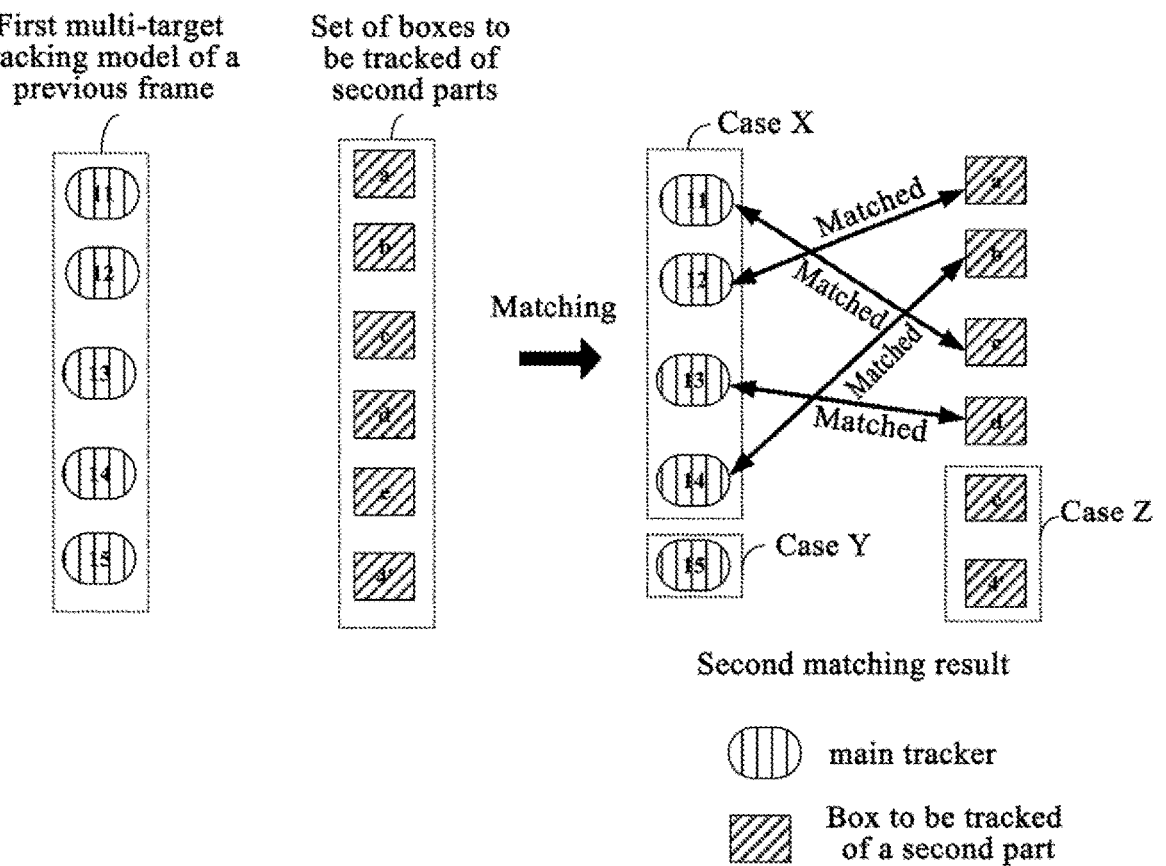
FIG. 5 is a schematic diagram illustrating how to perform a matching between a first multi-target tracking model of a previous frame and a respective box to be tracked of the second part in a current frame in an embodiment of the present disclosure.

FIG. 5 is a schematic diagram illustrating how to perform a matching between a first multi-target tracking model of a previous frame and a respective box to be tracked of the second part in a current frame in an embodiment of the present disclosure. As shown in FIG. 5, a matching is performed between the boxes a to e, and 4' to be tracked of the second part of the recognized targets in the current frame determined in FIG. 3 and the main trackers 11 to 15 in the first multi-target tracking model of the previous frame, so as to obtain a second matching result.

FIG. 5 exemplarily and schematically shows a case where the main tracker 11 is matched with the box c to be tracked of the second part, the main tracker 12 matches the box a to be tracked of the second part, the main tracker 13 matches the box d to be tracked of the second part, and the main tracker 14 matches the box b to be tracked of the second part.

In FIG. 5, it is exemplarily shown that the second matching result includes the above cases X, Y, and Z, which is only used for illustration, and does not limit the technical solution of the present disclosure.

Step S32, determining a target tracking result of the current frame according to the second matching result.

Step S32 may include step S3211 to step S3217, and/or step S3221 to step S3229, and/or step S3231 to step S3233.

Step S3211 is started when the above case X is present in the second matching result, step S3221 is started when the above case Y is present in the second matching result, and step S3231 is started when the above case Z is present in the second matching result.

Step S3211, taking the recognized target of the box to be tracked of the second part matched with the first main tracker as a first target to be tracked in the current frame, and setting an identifier of the first target to be tracked as an identifier of the target tracked by the matched first main tracker.

Step S3212, updating the matched first main tracker with the box to be tracked of the second part of the first target to be tracked, and taking the updated first main tracker as the main tracker of the first target to be tracked.

When the current frame is the last frame in the video stream, step S3212 may not be performed.

Step S3213, detecting whether the box to be tracked of the second part matched with the first main tracker is a recognition box of the second part matched with the recognition box of the first part or a recognition box obtained from the recognition box of the first part unmatched with the recognition box of the second part by enlarging a box region thereof, according to the first matching result, when it is detected that a single-target auxiliary tracker is carried by the first main tracker.

In practical applications, a single tracker has certain limitation on target tracking, and target tracking effects of different trackers have certain difference. Based on the above phenomenon, in the embodiment of the present disclosure, a corresponding single-target auxiliary tracker may be configured for the main tracker, and when the main tracker is unmatched with the box to be tracked of the second part in the current frame (that is, the target tracked by the main tracker is unmatched with the recognized target in the current frame), the single-target auxiliary tracker carried by the main tracker may be used to perform single-target tracking and search in the current frame, so as to perform a supplementary tracking and search on the target tracked by the main tracker in the current frame, which is beneficial to improving the tracking stability. The single-target auxiliary tracker has high running speed and requires less computing resources.

As an optional implementation, a field which can represent whether the main tracker carries a single-target auxiliary tracker or not can be configured for the main tracker. When a value of the field is null or a preset value (for example, the value is 0, which is referred to as a default value for short) which can represent that the single-target auxiliary tracker is not carried, it indicates that the main tracker does not carry the single-target auxiliary tracker. When a value of the field is not null and not a default value, it indicates that the main tracker carries the single-target auxiliary tracker, in which case the value of the field may be a pointer pointing to the single-target auxiliary tracker corresponding to the main tracker, and the corresponding single-target auxiliary tracker may be called through the pointer.

In some embodiments, the single-target auxiliary tracker is a Kernerlized Correlation Filter (KCF) single-target tracker. The tracking principle of the single-target auxiliary tracker is as follows: firstly, determining a box region corresponding to a target, then, extracting features (for example, extracting FHOG features) from the box region, then, mapping the extracted features to a high-dimensional space with a kernel function, and performing a cyclic sampling on the extracted features, then, training a filter based on sampling data to continuously update the filter until set training conditions are met, and at this time, the obtained filter is the KCF single-target tracker. With the KCF single-target tracker, a single-target tracking and search may be performed in a next frame (a tracking and search region may be preset), a tracking-and-search box may be obtained after the single-target tracking and search succeeds, and the KCF single-target tracker may feed back tracking and search failure information after the single-target tracking and search fails. The KCF single-target tracker may be represented by a filtering kernel matrix w, and the dimension of the filtering kernel matrix w may be preset.

Alternatively, the single-target auxiliary tracker in the embodiment of the present disclosure may be other types of single-target trackers, which is not limited by the present disclosure.

It should be noted that the SORT model has a certain limitation on target tracking. Specifically, the tracker (i.e. the main tracker) in the SORT model obtains a prediction box of the tracked target in the current frame based on the motion characteristics of the target to be tracked and the recognition result of the target. When the motion characteristics of the target change suddenly or a form of the target changes, the tracking of the main tracker is prone to fail. At this time, a KCF single-target tracker that performs target tracking based on a gradient feature of the target may be used to perform a supplementary tracking and search on the target tracked by the main tracker in the current frame, so as to effectively track the target with a sudden change in motion feature or a change in form, thereby effectively compensating for the problem of the limitation of the main tracker in tracking the target.

When it is detected in step S3213 that the box to be tracked of the second part matched with the first main tracker is the recognition box of the second part matched with the recognition box of the first part (the recognition box of the second part in case A), or is the recognition box obtained from the recognition box of the first part unmatched with the recognition box of the second part (the recognition box of the first part in case C) by enlarging a box region thereof, step S3214 is performed. When it is detected that the box to be tracked of the second part matched with the first main tracker is not the recognition box of the second part matched with the recognition box of the first part and is not the recognition box obtained from the recognition box of the first part unmatched with the recognition box of the second part (that is, the recognition box of the second part in case B) by enlarging the box region thereof, step S3215 is performed.

Step S3214, deleting the single-target auxiliary tracker carried by the first main tracker.

In the embodiment of the present disclosure, when a certain main tracker is matched with a certain box to be tracked of the second part, it indicates that a target tracked by the main tracker and a target to be tracked corresponding to the box to be tracked of the second part are the same target, that is, the tracking of the same target in adjacent frames is realized. Meanwhile, since the recognition box of the first part of the target is recognized in the current frame (namely the box to be tracked of the second part of the target meets the case A or the case C), it indicates that the target is accurately tracked, and in this case, a single-target auxiliary tracker is not required to be carried by the main tracker corresponding to the target, so that the single-target auxiliary tracker carried by the main tracker can be deleted, which is favorable to reduce the load in the system.

Step S3215, performing a single-target tracking and search in the current frame with the single-target auxiliary tracker carried by the first main tracker.

When the single-target tracking and search succeeds in step S3215, step S3216 is performed. When the single-target tracking and search fails in step S3215, step S3217 is performed.

Step S3216, performing a matching between a first tracking-and-search box obtained by the successful single-target tracking and search and the box to be tracked of the second part matched with the first main tracker.

In some embodiments, step S3216 may include: firstly, calculating a first intersection over union between the first tracking-and-search box obtained by the successful single-target tracking and search and the box to be tracked of the second part matched with the first main tracker; then, comparing the first intersection over union with a preset threshold of first intersection over union; when the first intersection over union is greater than or equal to the threshold of first intersection over union, recognizing that the first tracking-and-search box is matched with the box to be tracked of the second part; and when the first intersection over union is less than the threshold of first intersection over union, recognizing that the first tracking-and-search box is unmatched with the box to be tracked of the second part.

If it is recognized in step S3216 that the first tracking-and-search box is matched with the box to be tracked of the second part, it indicates that the tracking effect of the single-target auxiliary tracker is good, and the single-target auxiliary tracker is not required to be initialized; if it is recognized in step S3216 that the first tracking-and-search box is unmatched with the box to be tracked of the second part, it indicates that the tracking effect of the single-target auxiliary tracker is poor, then step S3217 is performed.

Step S3217, initializing the single-target auxiliary tracker with the box to be tracked of the second part matched with the first main tracker.

In the embodiment of the present disclosure, when the single-target tracking and search using the single-target auxiliary tracker fails in step S3215, or when it is recognized in step S3216 that the first tracking-and-search box is unmatched with the box to be tracked of the second part, it indicates that the tracking effect of the single-target auxiliary tracker is poor, and it is necessary to initialize the single-target auxiliary tracker with the box to be tracked of the second part matched with the first main tracker.

Step S3221, detecting whether the box to be tracked of the second part unmatched with the main tracker exists in the second matching result.

If it is detected in step S3221 that the box to be tracked of the second part unmatched with the main tracker exists in the second matching result, step S3222 is performed; if it is detected that no box to be tracked of the second part unmatched the main tracker exists in the second matching result, step S3228 is performed.

Step S3222, detecting whether the second main tracker carries a single-target auxiliary tracker.

If it is detected in step S3222 that the second main tracker does not carry the single-target auxiliary tracker, step S3223 is performed; if it is detected that the second main tracker carries the single-target auxiliary tracker, step S3224 is performed.

Step S3223, creating a single-target auxiliary tracker for the second main tracker, according to a box to be tracked of a second part of the target tracked by the second main tracker in a previous frame.

Step S3224 is continuously performed after step S3223 ends.

Step S3224, performing a single-target tracking and search in the current frame with the single-target auxiliary tracker carried by the second main tracker.

If the single-target tracking and search fails in step S3224, step S3228 is performed; if the single-target tracking and search succeeds, step S3225 is performed.

Step S3225, performing a matching between the second tracking-and-search box obtained by the successful single-target tracking and search and a respective box to be tracked of the second part unmatched with the main tracker in the second matching result.

In some embodiments, step S3225 includes: firstly, calculating a second intersection over union between the second tracking-and-search box obtained by the successful single-target tracking and search and the respective box to be tracked of the second part unmatched with the main tracker in a second matching result; then, comparing a maximum second intersection over union with a preset threshold of second intersection over union; if the maximum second intersection over union is greater than or equal to the threshold of second intersection over union, recognizing that the second tracking-and-search box is matched with the box to be tracked of the second part corresponding to the maximum second intersection over union; and if the maximum second intersection over union is less than the threshold of second intersection over union, recognizing that the second tracking-and-search box is unmatched with the respective box to be tracked of the second part unmatched with the main tracker in the second matching result.

If the second tracking-and-search box obtained by the successful single-target tracking and search is matched with one box to be tracked of the second part unmatched with the main tracker in the second matching result in step S3225, step S3226 is performed; if the second tracking-and-search box obtained by the successful single-target tracking and search is unmatched with the respective box to be tracked of the second part unmatched with the main tracker in the second matching result, step S3228 is performed.

Step S3226, taking a recognized target of the box to be tracked of the second part matched with the second tracking-and-search box as a second target to be tracked in the current frame, and setting an identifier of the second target to be tracked to be an identifier of the target tracked by the second main tracker followed by the single-target auxiliary tracker obtaining the matched second tracking-and-search box.

Step S3227a, updating the second main tracker followed by the single-target auxiliary tracker obtaining the matched second tracking-and-search box, with the box to be tracked of the second part of the second target to be tracked, and taking the updated second main tracker as the main tracker of the second target to be tracked, where the main tracker of the second target to be tracked carries the single-target auxiliary tracker.

When the current frame is the last frame in the video stream, step S3227a may not be performed.

Step S2337b, deleting the box to be tracked of the second part matched with the second tracking-and-search box from the box to be tracked of the second part unmatched with the main tracker included in the second matching result.

Step S3228, recognizing that the target tracked by the second main tracker does not appear in the current frame.

Step S3229, determining whether the number of consecutive frames, where the target tracked by the second main tracker does not appear, reaches a preset threshold of number of frames.

When it is determined that the number of consecutive frames, where the target tracked by the second main tracker does not appear, reaches the preset threshold of number of frames, deleting the second main tracker; and when it is determined that the number of consecutive frames, where the target tracked by the second main tracker does not appear, does not reach the preset threshold of number of frames, reserving the second main tracker.

It should be noted that, in some embodiments, in order to avoid the problem that the load in the system is too large due to too many main trackers existing in the system, in the technical solution of the present disclosure, the main tracker corresponding to the target to be tracked that does not appear in consecutive multiple frames may be deleted.

Optionally, in some embodiments, prior to step S3223, the method further includes step S3223a.

Step S3223a, determining whether a total number of currently existing single-target auxiliary trackers reaches a threshold of maximum number.

When it is determined in step S3223a that the total number of the currently existing single-target auxiliary trackers does not reach the threshold of maximum number, step S3223 is performed; and when it is determined that the total number of the currently existing single-target auxiliary trackers reaches the threshold of maximum number, step S3228 is performed.

It should be noted that, the case, where step S3223a is set prior to step S3223, is only an optional implementation in the embodiment of the present disclosure, and does not limit the technical solution of the present disclosure.

Step S3231, according to the first matching result, detecting whether the box to be tracked of the second part unmatched with the main tracker in the second matching result is a recognition box of the second part matched with the recognition box of the first part or an recognition box obtained from the recognition box of the first part unmatched with the recognition box of the second part by enlarging a box region thereof.

If it is detected in step S3231 that the box to be tracked of the second part unmatched with the main tracker in the second matching result is the recognition box of the second part matched with the recognition box of the first part (the recognition box of the second part in case A), or the recognition box obtained from the recognition box of the first part unmatched with the recognition box of the second part (the recognition box of the first part in case C) by enlarging the box region thereof, step S3232 is performed; and if it is detected that the box to be tracked of the second part unmatched with the main tracker in the second matching result is not the recognition box of the second part matched with the recognition box of the first part and is not the recognition box obtained from the recognition box of the first part unmatched with the recognition box of the second part (that is, the box to be tracked of the second part is the recognition box of the second part in case B) by enlarging the box region thereof, the box to be tracked of the second part is not required to be further processed.

Step S3232, taking a recognized target of the box to be tracked of the second part as a third target to be tracked in the current frame, and creating a new identifier for the third target to be tracked.

Step S3233, creating a third main tracker for the third target to be tracked.

A corresponding third main tracker for the third target to be tracked is created according to the box to be tracked of the second part corresponding to the third target to be tracked.

FIG. 6 is a flowchart of another target tracking method according to an embodiment of the present disclosure. As shown in FIG. 6, the target has a third part, and the method includes the following steps Sa, Sb, and Sd.

Step Sa, performing a third part recognition in a current frame, to obtain a box to be tracked of a third part of a recognized target in the current frame.

In step Sa, when performing the third part recognition in the current frame, at least one recognition box of the third part may be obtained. Each of the at least one recognition box of the third part may be taken as a box to be tracked of the third part of a recognized target for subsequent processing.

Step Sb, performing a matching between a second multi-target tracking model of a previous frame and a respective box to be tracked of the third part in the current frame, to obtain a third matching result, where the second multi-target tracking model of the previous frame includes main trackers of a plurality of targets to be tracked in the previous frame.

the matching process between the second multi-target tracking model and the box to be tracked of the third part, is similar to the matching process between the first multi-target tracking model and the box to be tracked of the second part in the foregoing embodiment, and is not repeated herein.

It should be noted that, in the foregoing embodiment, the main tracker in the first multi-target tracking model is a tracker that tracks the second part of the tracked target, and the main tracker is generated and updated based on the image of the second part of the tracked target. In this embodiment, the main tracker in the second multi-target tracking model is a tracker that tracks the third part of the tracked target, and the main tracker is generated and updated based on the image of the third part of the tracked target.

The third part in the embodiment of the present disclosure may be the first part, the second part in the foregoing embodiment, or another part of the target different from the first part and the second part.

Step Sd, performing a single-target tracking and search in the current frame with a single-target auxiliary tracker carried by the fifth main tracker, when the third matching result includes the fifth main tracker unmatched with the box to be tracked of the third part.

In practical applications, a single tracker has certain limitation on target tracking, and a certain difference exists between target tracking effects of different trackers. Based on the above phenomenon, in the embodiment of the present disclosure, a corresponding single-target auxiliary tracker may be configured for the main tracker, and when the main tracker is unmatched with the recognition box of the third part in the current frame (that is, the target tracked by the main tracker is unmatched with the recognized target in the current frame), the single-target auxiliary tracker carried by the main tracker may be used to perform single-target tracking and search in the current frame, so as to perform supplementary tracking and search on the target tracked by the main tracker in the current frame, which is beneficial to improving the tracking stability. The single-target auxiliary tracker has high running speed and less required computing resources.

Figure 7:
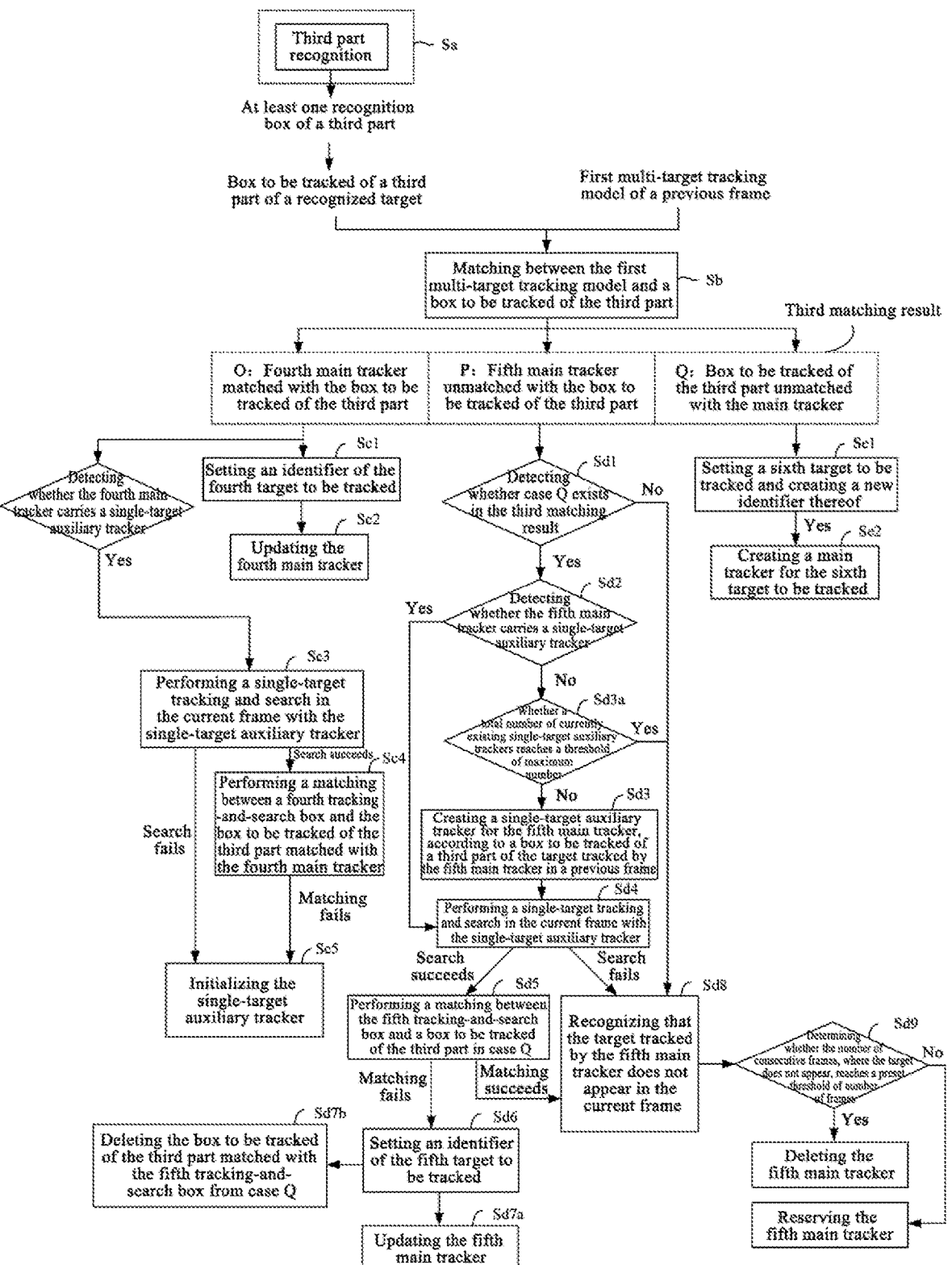
FIG. 7 is a flowchart of another target tracking method according to an embodiment of the present disclosure.

FIG. 7 is a flowchart of another target tracking method according to an embodiment of the present disclosure. As shown in FIG. 7, the target tracking method includes the following steps.

Step Sa, performing a third part recognition in a current frame, to obtain a box to be tracked of a third part of a recognized target in the current frame.

Step Sb, performing a matching between a second multi-target tracking model of a previous frame and a respective box to be tracked of the third part in the current frame, to obtain a third matching result, where the second multi-target tracking model of the previous frame includes main trackers of a plurality of targets to be tracked in the previous frame.

The third matching result includes at least one of the following three cases.

Case O: there is a main tracker matched with the box to be tracked of the third part (referred to as a fourth main tracker);

Case P: there is a main tracker unmatched with a box to be tracked of the third part (referred to as a fifth main tracker);

Case Q: there is a box to be tracked of the third part unmatched with the main tracker.

Step Sc1 is started when the above case O is present in the third matching result, step Sd1 is started when the above case P is present in the third matching result, and step Se1 is started when the above case Q is present in the third matching result.

Step Sc1, taking the recognized target of the box to be tracked of the third part matched with the fourth main tracker as a fourth target to be tracked in the current frame, and setting an identifier of the fourth target to be tracked to be an identifier of the target tracked by the matched fourth main tracker.

Step Sc2, updating the matched fourth main tracker with the box to be tracked of the third part of the fourth target to be tracked, and taking the updated fourth main tracker as the main tracker of the fourth target to be tracked.

When the current frame is the last frame in the video stream, step Sc2 may not be performed.

Step Sc3, performing a single-target tracking and search in the current frame with a single-target auxiliary tracker carried by the fourth main tracker, when it is detected that the fourth main tracker carries the single-target auxiliary tracker.

When the single-target tracking and search succeeds in step Sc3, executing step Sc4 is performed. When the single-target tracking and search fails in step Sc3, step Sc5 is performed.

Step Sc4, performing a matching between a fourth tracking-and-search box obtained by the successful single-target tracking and search and the box to be tracked of the third part matched with the fourth main tracker.

In some embodiments, step Sc4 may include: firstly, calculating a fourth intersection over union between the fourth tracking-and-search box obtained by the successful single-target tracking and search and the box to be tracked of the third part matched with the fourth main tracker; then, comparing the fourth intersection over union with a preset threshold of fourth intersection over union; when the fourth intersection over union is greater than or equal to the threshold of fourth intersection over union, recognizing that the fourth tracking-and-search box is matched with the box to be tracked of the third part; and when the fourth intersection over union is less than the threshold of fourth intersection over union, recognizing that the fourth tracking-and-search box is unmatched with the box to be tracked of the third part.

If it is recognized in step Sc4 that the fourth tracking-and-search box is matched with the box to be tracked of the third part, it indicates that the tracking effect of the single-target auxiliary tracker is good, and the single-target auxiliary tracker is not required to be initialized; if it is recognized in step Sc4 that the fourth tracking-and-search box is unmatched with the box to be tracked of the third part, it indicates that the tracking effect of the single-target auxiliary tracker is poor, then step Sc5 is performed.

Step Sc5, initializing the single-target auxiliary tracker with the box to be tracked of the third part matched with the fourth main tracker.

In the embodiment of the present disclosure, when the single-target tracking and search using the single-target auxiliary tracker fails in step Sc3, or when it is recognized in step Sc4 that the fourth tracking-and-search box is unmatched with the box to be tracked of the third part, it indicates that the tracking effect of the single-target auxiliary tracker is poor, and it is necessary to initialize the single-target auxiliary tracker with the box to be tracked of the third part matched with the fourth main tracker.

Step Sd1, detecting whether the box to be tracked of the third part unmatched with the main tracker exists in the third matching result.

If it is detected in step Sd1 that the box to be tracked of the third part unmatched with the main tracker exists in the third matching result, step Sd2 is performed; if it is detected that no box to be tracked of the third part unmatched with the main tracker exists in the third matching result, step Sd8 is performed.

Step Sd2, detecting whether the fifth main tracker carries a single-target auxiliary tracker.

If it is detected in step Sd2 that the fifth main tracker does not carry the single-target auxiliary tracker, step Sd3 is performed; if it is detected the fifth main tracker carries the single-target auxiliary tracker, step Sd4 is performed.

Step Sd3, creating a single-target auxiliary tracker for the fifth main tracker according to a box to be tracked of the third part of the target tracked by the fifth main tracker in a previous frame.

Step Sd4 is continuously performed after step Sd3 ends.

Step Sd4, performing single-target tracking and search in the current frame with the single-target auxiliary tracker carried by the fifth main tracker.

If the single-target tracking and search fails in step Sd4, step Sd8 is performed; if the single-target tracking and search succeeds, step Sd5 is performed.

Step Sd5, performing a matching between the fifth tracking-and-search box obtained by the successful single-target tracking and search and a respective box to be tracked of the third part unmatched with the main tracker in the third matching result.

In some embodiments, step Sd5 includes: firstly, calculating a fifth intersection over union between the fifth tracking-and-search box obtained by the successful single-target tracking and search and the respective box to be tracked of the third part unmatched with the main tracker in a third matching result; then, comparing a maximum fifth intersection over union with a preset threshold of fifth intersection over union; if the maximum fifth intersection over union is greater than or equal to a threshold of fifth intersection over union, recognizing that the fifth tracking-and-search box is matched with the box to be tracked of the third part corresponding to the maximum fifth intersection over union; and if the maximum fifth intersection over union is less than the threshold of fifth intersection over union, recognizing that the fifth tracking-and-search box is unmatched with the respective box to be tracked of the third part unmatched with the main tracker in the third matching result.

If the fifth tracking-and-search box obtained by the successful single-target tracking and search is matched with one box to be tracked of the third part unmatched with the main tracker in the third matching result in step Sd5, step Sd6 is performed; if the fifth tracking-and-search box obtained by the successful single-target tracking and search is unmatched with the respective box to be tracked of the third part unmatched with the main tracker in the third matching result, step Sd8 is performed.

Step Sd6, taking a recognized target of the box to be tracked of the third part matched with the fifth tracking-and-search box as a fifth target to be tracked in the current frame, and setting an identifier of the fifth target to be tracked as an identifier of the target tracked by the fifth main tracker followed by the single-target auxiliary tracker obtaining the matched fifth tracking-and-search box.

Sd7a, updating the fifth main tracker followed by the single-target auxiliary tracker of the matched fifth tracking-and-search box, with the box to be tracked of the third part of the fifth target to be tracked, and taking the updated fifth main tracker as the main tracker of the fifth target to be tracked, where the main tracker of the fifth target to be tracked carries the single-target auxiliary tracker.

When the current frame is the last frame in the video stream, step Sd7a may not be performed.

Step Sd7b, deleting the box to be tracked of the third part matched with the fifth tracking-and-search box from the box to be tracked of the third part unmatched with the main tracker included in the third matching result.

Step Sd8, recognizing that the target tracked by the fifth main tracker does not appear in the current frame.

Step Sd9, determining whether the number of consecutive frames, where the target tracked by the fifth main tracker does not appear, reaches a preset threshold of number of frames.

When it is determined that the number of consecutive frames, where the target tracked by the fifth main tracker does not appear, reaches the preset threshold of number of frames, deleting the fifth main tracker; and when it is determined that the number of consecutive frames, where the target tracked by the fifth main tracker does not appear, does not reach the preset threshold of number of frames, reserving the fifth main tracker.

It should be noted that, in some embodiments, in order to avoid the problem that the load in the system is too large due to too many main trackers existing in the system, in the technical solution of the present disclosure, the main tracker corresponding to the target to be tracked that does not appear in consecutive multiple frames may be deleted.

Optionally, in some embodiments, prior to step Sd3, the method further includes step Sd3a.

Step Sd3a, determining whether a total number of currently existing single-target auxiliary trackers reaches a threshold of maximum number.

When it is determined in step Sd3a that the total number of the currently existing single-target auxiliary trackers does not reach the threshold of maximum number, step Sd3 is performed; and when it is determined that the total number of the currently existing single-target auxiliary trackers does not reach the threshold of maximum number, step Sd8 is performed.

It should be noted that, the case, where step Sd3a is set prior to step Sd3, is only an optional implementation in the embodiment of the present disclosure, and does not limit the technical solution of the present disclosure.

Step Se1, for the box to be tracked of the third part unmatched with the main tracker, taking a recognized target of the box to be tracked of the third part as a sixth target to be tracked in the current frame, and creating a new identifier for the sixth target to be tracked.

Step Se2, creating a sixth main tracker for the sixth target to be tracked.

In addition, corresponding trigger conditions may be set for deleting the single-target auxiliary tracker. As an example, the existence lifetime of each single-target auxiliary tracker may be set, for example, to be 5 frames, and after 5 frames of time from the creation of the single-target auxiliary tracker, the single-target auxiliary tracker is automatically deleted. As another example, when a single-target auxiliary tracker carried by a certain main tracker appears in several consecutive frames, for example, 3 consecutive frames, the single-target auxiliary tracker is required to be initialized through step Sc5, and the single-target auxiliary tracker will be automatically deleted.

It should be noted that the trigger condition set for deleting the single-target auxiliary tracker is not limited by the technical solution of the present disclosure.

Figure 8:
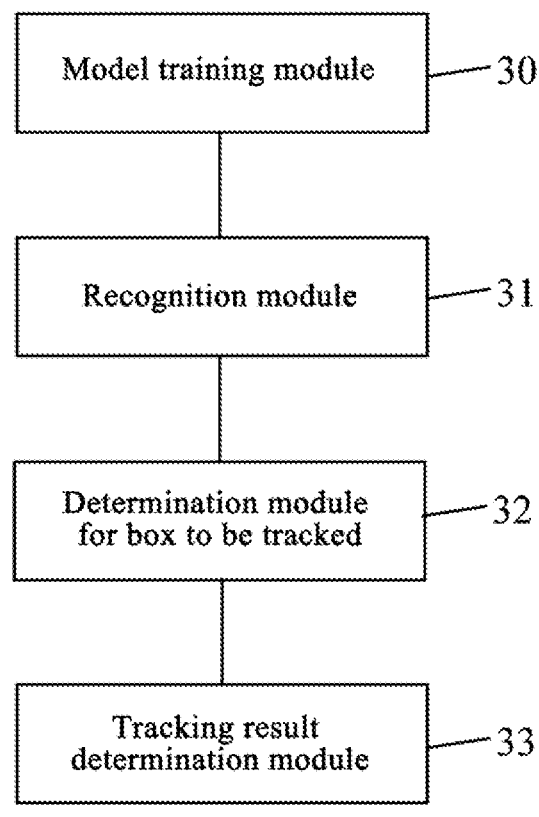
FIG. 8 is a block diagram of a target tracking system according to an embodiment of the present disclosure.

Based on the same inventive concept, an embodiment of the present disclosure further provides a target tracking system. FIG. 8 is a block diagram of a target tracking system according to an embodiment of the present disclosure. As shown in FIG. 8, the target tracking system is used to implement the target tracking method according to the foregoing embodiment, and the target tracking system includes an recognition module 31, a determination module 32 for box to be tracked and a tracking result determination module 33.

The recognition module 31 is configured to perform a first part recognition and a second part recognition in a current frame, to obtain at least one recognition box of a first part and at least one recognition box of a second part.

The determination module 32 for box to be tracked is configured to perform a matching between the at least one recognition box of the first part and the at least one recognition box of the second part, to obtain a first matching result, and determine a box to be tracked of a second part of a recognized target in the current frame, according to the first matching result, where the box to be tracked of the second part of the recognized target in the current frame includes the at least one recognition box of the second part and a recognition box obtained from the recognition box of the first part unmatched with the recognition box of the second part, by enlarging a box region thereof.

The tracking result determination module 33 is configured to performing a matching between a first multi-target tracking model of a previous frame and a respective box to be tracked of the second part in the current frame, to obtain a second matching result, and determine a target tracking result of the current frame according to the second matching result, where the first multi-target tracking model of the previous frame includes main trackers of a plurality of targets to be tracked in the previous frame.

In some embodiments, the tracking result determination module 33 includes a first processing unit. The first processing unit is configured to take the recognized target of the box to be tracked of the second part matched with the first main tracker as a first target to be tracked in the current frame, and set an identifier of the first target to be tracked as an identifier of the target tracked by the matched first main tracker, when the first main tracker matched with the box to be tracked of the second part is present in the second matching result.

In some embodiments, the first processing unit is further configured to update the matched first main tracker with the box to be tracked of the second part of the first target to be tracked, and take the updated first main tracker as the main tracker of the first target to be tracked, after setting the identifier of the first target to be tracked as the identifier of the matched target tracked by the first main tracker.

In some embodiments, the first processing unit is further configured to, after setting the identifier of the first target to be tracked as the identifier of the matched target tracked by the first main tracker, when it is detected that the first main tracker carries the single-target auxiliary tracker, detect, according to the first matching result, whether the box to be tracked of the second part matched with the first main tracker is a recognition box of the second part matched with the recognition box of the first part or a recognition box obtained from the recognition box of the first part unmatched with the recognition box of the second part by enlarging a box region thereof; when it is detected that the box to be tracked of the second part matched with the first main tracker is not the recognition box of the second part matched with the recognition box of the first part and is not the recognition box obtained from the recognition box of the first part unmatched with the recognition box of the second part by enlarging a box region thereof, perform a single-target tracking and search in the current frame with the single-target auxiliary tracker carried by the first main tracker; and when the single-target tracking and search fails or when the single-target tracking and search succeeds but the obtained first tracking-and-search box is unmatched with the box to be tracked of the second part matched with the first main tracker, initialize the single-target auxiliary tracker with the box to be tracked of the second part matched with the first main tracker.

In some embodiments, the first processing unit is further configured to, after performing the single-target tracking and search in the current frame with the single-target auxiliary tracker carried by the first main tracker and the single-target tracking and search succeeds, calculate a first intersection over union between the first tracking-and-search box obtained by the successful single-target tracking and search and the box to be tracked of the second part matched with the first main tracker, compare the first intersection over union with a preset threshold of first intersection over union, and recognize that the first tracking-and-search box is unmatched with the box to be tracked of the second part, when the first intersection over union is less than the threshold of first intersection over union.

In some embodiments, the first processing unit is further configured to delete the single-target auxiliary tracker carried by the first main tracker, when it is detected that the box to be tracked of the second part matched with the first main tracker is the recognition box of the second part matched with the recognition box of the first part, or is the recognition box obtained from the recognition box of the first part unmatched with the recognition box of the second part by enlarging a box region thereof.

In some embodiments, the tracking result determination module 33 includes a second processing unit. The second processing unit is configured to detect whether the box to be tracked of the second part unmatched with the main tracker exists in the second matching result, when the second matching result includes a second main tracker unmatched with the box to be tracked of the second part; and recognize that the target tracked by the second main tracker does not appear in the current frame, when it is detected that no box to be tracked of the second part unmatched with the main tracker exists in the second matching result.

In some embodiments, the second processing unit is further configured to detect whether the second main tracker carries a single-target auxiliary tracker when it is detected that the box to be tracked of the second part unmatched with the main tracker exists in the second matching result; create a single-target auxiliary tracker for the second main tracker, according to a box to be tracked of a second part of a target tracked by the second main tracker in a previous frame, and perform a single-target tracking and search in the current frame with the single-target auxiliary tracker carried by the second main tracker, when it is detected that the second main tracker does not carry the single-target auxiliary tracker; and take a recognized target of the box to be tracked of the second part matched with the second tracking-and-search box as a second target to be tracked in the current frame, and set an identifier of the second target to be tracked as an identifier of the target tracked by the second main tracker followed by the single-target auxiliary tracker obtaining the matched second tracking-and-search box, when the single-target tracking and search succeeds and the obtained second tracking-and-search box is matched with one box to be tracked of the second part unmatched with the main tracker in the second matching result.

In some embodiments, the second processing unit is further configured to, after setting the identifier of the second target to be tracked as the identifier of the target tracked by the second main tracker followed by the single-target auxiliary tracker obtaining the matched second tracking-and-search box, update, with the box to be tracked of the second part of the second target to be tracked, the second main tracker followed by the single-target auxiliary tracker obtaining the matched second tracking-and-search box, and take the updated second main tracker as the main tracker of the second target to be tracked, where the main tracker of the second target to be tracked carries the single-target tracking and search.

In some embodiments, the second processing unit is further configured to, after the single-target tracking and search is performed in the current frame with the single-target auxiliary tracker carried by the second main tracker and the single-target tracking and search succeeds, calculate a second intersection over union between the second tracking-and-search box obtained by the successful single-target tracking and search and the respective box to be tracked of the second part unmatched with the main tracker in the second matching result; compare a maximum second intersection over union with a preset threshold of second intersection over union; and recognize that the second tracking-and-search box is matched with the box to be tracked of the second part corresponding to the maximum first intersection over union, when the maximum first intersection over union is greater than or equal to a threshold of second intersection over union.

In some embodiments, the second processing unit is further configured to, when the single-target tracking and search succeeds and the obtained second tracking-and-search box is matched with one of the recognition box of the second part unmatched with the main tracker in the second matching result, delete the box to be tracked of the second part matched with the second tracking-and-search box from the box to be tracked of the second part unmatched with the main tracker included in the second matching result.

In some embodiments, the second processing unit is further configured to determine that the total number of currently existing single-target auxiliary trackers reaches a threshold of maximum number prior to creating the single-target auxiliary tracker for the second main tracker; when it is determined that the total number of the currently existing single-target auxiliary trackers does not reach the threshold of maximum number, perform the step of creating a single-target auxiliary tracker for the second main tracker; and when it is determined that the total number of the currently existing single-target auxiliary trackers reaches the threshold of maximum number, recognize that the target tracked by the second main tracker does not appear in the current frame.

In some embodiments, the second processing unit is further configured to, after recognizing that the target tracked by the second main tracker does not appear in the current frame, determine whether the number of consecutive frames, where the target tracked by the second main tracker does not appear, reaches a preset threshold of number of frames; and delete the second main tracker when it is determined that the number of consecutive frames, where the target tracked by the second main tracker does not appear, reaches the preset threshold of number of frames.

In some embodiments, the single-target auxiliary tracker is a kernerlized correlation filter single-target tracker.

In some embodiments, the tracking result determination module 33 includes a third processing unit. The third processing unit is configured to detect, according to the first matching result, whether the box to be tracked of the second part unmatched with the main tracker in the second matching result is a recognition box of the second part matched with the recognition box of the first part or an recognition box obtained from the recognition box of the first part unmatched with the recognition box of the second part, by enlarging a box region thereof, when the box to be tracked of the second part unmatched with the main tracker exists in the second matching result; and when it is detected that the box to be tracked of the second part unmatched with the main tracker is the recognition box of the second part matched with the recognition box of the first part, or is the recognition box obtained from the recognition box of the first part unmatched with the recognition box of the second part by enlarging a box region thereof, take a recognized target of the box to be tracked of the second part as a third target to be tracked in the current frame, and create a new identifier for the third target to be tracked.

In some embodiments, the third processing unit is further configured to create a third main tracker for the third target to be tracked after creating the new identifier for the third target to be tracked.

In some embodiments, the target tracking system further includes a model training module 30. The model training module 30 is configured to train a first part recognition model for performing the first part recognition and a second part recognition model for performing the second part recognition based on the Faster RCNN algorithm. The recognition module is specifically configured to perform the first part recognition on the current frame with the first part recognition model, and perform the second part recognition on the current frame with the second part recognition model.

In some embodiments, the determination module 32 for box to be tracked is specifically configured to calculate a third intersection over union between each recognition box of the first part and every recognition box of the second part; and perform a matching between the recognition box of the first part and the recognition box of the second part with a preset matching algorithm, according to the third intersection over union between each recognition box of the first part and every recognition box of the second part.

In some embodiments, the predetermined matching algorithm includes a maximum weight bipartite graph matching algorithm.

The determination module 32 for box to be tracked is further configured to reset the calculated third intersection weight less than a threshold of the third intersection over union to 0, prior to performing a matching between the recognition box of the first part and the recognition box of the second part with the maximum weight bipartite graph matching algorithm. Alternatively, the matching module is further configured to cancel a match between the recognition box of the first part and the recognition box of the second part, which have the third intersection over union less than a preset third intersection over union threshold, in a matching result obtained after the matching processing is performed with the maximum weight bipartite graph matching algorithm, after performing a matching between the recognition box of the first part and the recognition box of the second part with the maximum weight bipartite graph matching algorithm.

The tracking result determination module 33 further includes a matching unit. The matching unit is configured to perform a matching between a first multi-target tracking model of a previous frame with a respective box to be tracked of the second part in the current frame.

In some embodiments, the matching unit is specifically configured to, for a main tracker of each target to be tracked in the previous frame, predict a prediction box of the tracked target in the current frame according to the main tracker, and perform a matching between the prediction box with the respective box to be tracked of the second part.

In some embodiments, the first multi-target tracking model is a simple online realtime tracking model, and the main tracker is a Kalman filter tracker.

In some embodiments, the first part is a face, and the second part is a head or an upper body.

Figure 9:
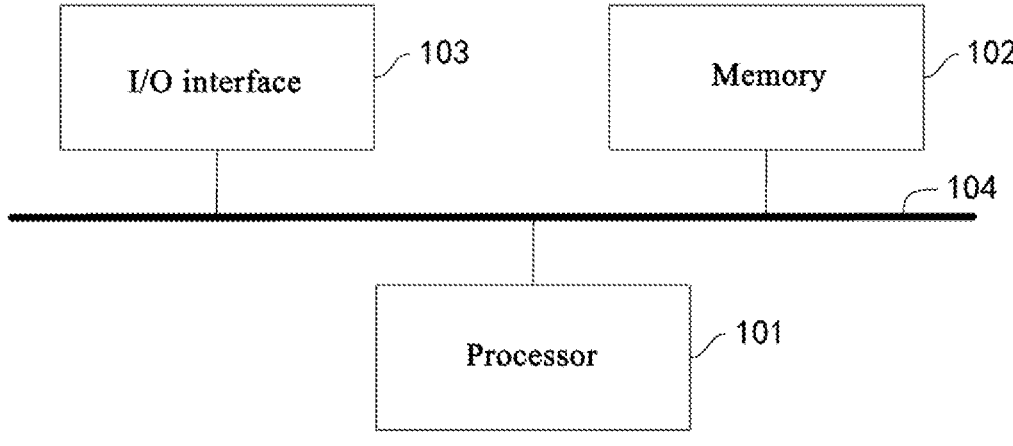
FIG. 9 is a schematic diagram illustrating a structure of an electronic device according to an embodiment of the present disclosure.

FIG. 9 is a schematic structural diagram of an electronic device according to an embodiment of the present disclosure. As shown in FIG. 9, an embodiment of the present disclosure provides an electronic device including one or more processors 101, a memory 102, and one or more I/O interfaces 103. The memory 102 stores one or more programs that, when executed by the one or more processors, cause the one or more processors to implement the target tracking method in any one of the above embodiments. The one or more I/O interfaces 103 are coupled between the processor and the memory, and are configured to enable information interaction between the processor and the memory.

The processor 101 is a device with data processing capability, which includes but is not limited to a central processing unit (CPU), or the like. The memory 102 is a device having data storage capabilities including, but not limited to, random access memory (RAM, more specifically SDRAM, DDR, etc.), read only memory (ROM), electrically erasable programmable read only memory (EEPROM), flash memory (FLASH). The I/O interface (read/write interface) 103 coupled between the processor 101 and the memory 102 may enable information interaction between the processor 101 and the memory 102, which may include, but is not limited to, a data bus (Bus), or the like.

In some embodiments, the processor 101, the memory 102, and the I/O interface 103 are connected to each other through a bus 104, and in turn to other components of the computing device.

According to an embodiment of the present disclosure, a non-transitory computer readable medium is further provided. The non-transitory computer readable medium stores thereon a computer program which, when being executed by a processor, implements steps in any one target tracking method in the above embodiments.

In particular, according to an embodiment of the present disclosure, the process described above with reference to the flow chart may be implemented as a computer software program. For example, an embodiment of the present disclosure includes a computer program product including a computer program carried on a machine readable medium, where the computer program includes program codes for performing the method illustrated by the flow chart. In such an embodiment, the computer program may be downloaded and installed from a network via a communication part, and/or installed from a removable medium. The above functions defined in the system of the present disclosure are performed when the computer program is performed by a Central Processing Unit (CPU).

It should be noted that the non-transitory computer readable medium shown in the present disclosure may be a computer readable signal medium, a computer readable storage medium, or any combination of the two. A computer readable storage medium may be, for example, but not limited to, an electronic, magnetic, optical, electromagnetic, infrared, or semiconductor system, apparatus, or device, or any combination thereof. More specific examples of the computer readable storage medium may include, but are not limited to, an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. In the present disclosure, a computer readable storage medium may be any tangible medium that contains or stores a program, which can be used by or in connection with an instruction execution system, apparatus, or device. In contrast, in the present disclosure, a computer readable signal medium may include a propagated data signal with computer readable program code carried therein, in a baseband or as a part of a carrier wave. Such a propagated data signal may take any of a variety of forms, including, but not limited to, electro-magnetic signal, optical signal, or any suitable combination thereof. A computer readable signal medium may also be any non-transitory computer readable medium other than a computer readable storage medium, which may transmit, propagate, or convey a program for use by or in connection with an instruction execution system, apparatus, or device. The program codes on the non-transitory computer readable medium may be conveyed by any appropriate medium, including but not limited to wireless, a wire, fiber optic cable, RF, etc., or any suitable combination thereof.

The flowchart and block diagram in the figures illustrate an architecture, functionality, and operation possibly implemented by the system, the method and the computer program product according to various embodiments of the present disclosure. In this regard, each block in the flowchart or block diagram may represent a module, a program segment, or a part of codes, which includes one or more executable instructions for implementing a specified logical function. It should also be noted that, in some alternative implementations, the function noted in the block may occur in a different order from that noted in the figures. For example, two blocks shown in succession may, in fact, be executed substantially concurrently, or the blocks may sometimes be executed in a reverse order, depending upon the functionality involved. It should also be noted that each block in the block diagram and/or the flowchart, and combinations of blocks in the block diagram and/or the flowchart, may be implemented by a special purpose hardware-based system that performs the specified function or act, or by a combination of a special purpose hardware and computer instructions.

A circuit or sub-circuit described in the embodiment of the present disclosure may be implemented by a software or a hardware. The described circuit or sub-circuit may alternatively be arranged in a processor, for example, may be described as: a processor, including a receiving circuit and a processing circuit, where the processing circuit includes a writing sub-circuit and a reading sub-circuit. The designation of such circuit or sub-circuit does not in some cases constitute a limitation on the circuit or sub-circuit itself, for example, the receiving circuit may alternatively be described as "receiving a video signal".

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and scope of the present disclosure, and such modifications and improvements are also considered to be within the scope of the present disclosure.

What is claimed is:

1. A method of tracking a target, wherein the target has a second part comprising a first part and a part other than the first part, and the method comprises:

performing a first part recognition and a second part recognition in a current frame, to obtain at least one recognition box of the first part and at least one recognition box of the second part, respectively;

performing a matching between the at least one recognition box of the first part and the at least one recognition box of the second part, to obtain a first matching result, and determining a box to be tracked of the second part of a recognized target in the current frame, according to the first matching result, wherein the box to be tracked of the second part of the recognized target in the current frame comprises the at least one recognition box of the second part, and the box to be tracked of the second part of the recognized target in the current frame further comprises a recognition box obtained from a recognition box of the first part unmatched with the at least one recognition box of the second part, by enlarging a box region of the recognition box of the first part unmatched with the at least one recognition box of the second part; and performing a matching operation on a respective box to be tracked of the second part in the current frame, based on a first multi-target tracking model of a previous frame, to obtain a second matching result, and determining a target tracking result of the current frame according to the second matching result, wherein the first multi-target tracking model of the previous frame comprises main trackers of a plurality of targets to be tracked in the previous frame, wherein the step of determining a target tracking result of the current frame according to the second matching result comprises:

detecting whether the box to be tracked of the second part unmatched with the main tracker exists in the second matching result, in response to that the second matching result comprises a second main tracker unmatched with the box to be tracked of the second part; and recognizing that the target tracked by the second main tracker does not appear in the current frame, in response to that the box to be tracked of the second part unmatched with the main tracker does not exist in the second matching result, wherein the method further comprises:

detecting whether the second main tracker carries a single-target auxiliary tracker, in response to that the box to be tracked of the second part unmatched with the main tracker exists in the second matching result;

creating a single-target auxiliary tracker for the second main tracker, according to the box to be tracked of the second part of the target tracked by the second main tracker in the previous frame, and performing a single-target tracking and search in the current frame with the single-target auxiliary tracker carried by the second main tracker, in response to that the second main tracker does not carry the single-target auxiliary tracker; and taking a recognized target of the box to be tracked of the second part matched with the second tracking-and-search box as a second target to be tracked in the current frame, and setting an identifier of the second target to be tracked to be an identifier of the target tracked by the second main tracker followed by the single-target auxiliary tracker obtaining the matched second tracking-and-search box, in response to that the single-target tracking and search succeeds and the obtained second tracking-and-search box is matched with one box to be tracked of the second part unmatched with the main tracker in the second matching result.

2. The method according to claim 1, wherein the step of determining a target tracking result of the current frame according to the second matching result comprises:

taking the recognized target of the box to be tracked of the second part matched with a first main tracker as a first target to be tracked in the current frame, and setting an identifier of the first target to be tracked as an identifier of the target tracked by the matched first main tracker, in response to that the second matching result comprises the first main tracker matched with the box to be tracked of the second part.

3. The method according to claim 2, wherein subsequent to the step of setting an identifier of the first target to be tracked as an identifier of the target tracked by the matched first main tracker, the method further comprises:

updating the matched first main tracker with the box to be tracked of the second part of the first target to be tracked, and taking the updated first main tracker as the main tracker of the first target to be tracked.

4. The method according to claim 3, wherein subsequent to the step of setting an identifier of the first target to be tracked as an identifier of the target tracked by the matched first main tracker, the method further comprises:

detecting whether the box to be tracked of the second part matched with the first main tracker is the recognition box of the second part matched with the recognition box of the first part or the recognition box obtained from the recognition box of the first part unmatched with the recognition box of the second part by enlarging a box region thereof, according to the first matching result, in response to that the first main tracker carries a single-target auxiliary tracker;

performing a single-target tracking and search in the current frame with the single-target auxiliary tracker carried by the first main tracker, in response to that the box to be tracked of the second part matched with the first main tracker is not the recognition box of the second part unmatched with the recognition box of the first part and is not the recognition box obtained from the recognition box of the first part unmatched with the recognition box of the second part by enlarging the box region thereof; and initializing the single-target auxiliary tracker with the box to be tracked of the second part matched with the first main tracker, in response to that the single-target tracking and search fails, or the single-target tracking and search succeeds but a first tracking-and-search box obtained by the single-target tracking and search is unmatched with the box to be tracked of the second part matched with the first main tracker.

5. The method according to claim 4, wherein after the single-target tracking and search is performed in the current frame with the single-target auxiliary tracker carried by the first main tracker and the single-target tracking and search succeeds, the method further comprises:

calculating a first intersection over union between the first tracking-and-search box obtained by the successful single-target tracking and search and the box to be tracked of the second part matched with the first main tracker;

comparing the first intersection over union with a preset threshold of first intersection over union; and recognizing that the first tracking-and-search box is unmatched with the box to be tracked of the second part, in response to that the first intersection over union is less than the threshold of first intersection over union.

6. The method according to claim 4, further comprising: deleting the single-target auxiliary tracker carried by the first main tracker, in response to that the box to be tracked of the second part matched with the first main tracker is the recognition box of the second part matched with the recognition box of the first part, or is the recognition box obtained from the recognition box of the first part unmatched with the recognition box of the second part by enlarging a box region thereof.

7. The method according to claim 1, wherein subsequent to the step of setting an identifier of the second target to be tracked to be an identifier of the target tracked by the second main tracker followed by the single-target auxiliary tracker obtaining the matched second tracking-and-search box, the method further comprises:

updating the second main tracker followed by the single-target auxiliary tracker obtaining the matched second tracking-and-search box, with the box to be tracked of the second part of the second target to be tracked, and taking the updated second main tracker as the main tracker of the second target to be tracked, wherein the main tracker of the second target to be tracked carries the single-target auxiliary tracker.

8. The method according to claim 1, wherein after the single-target tracking and search is performed in the current frame with the single-target auxiliary tracker carried by the second main tracker and the single-target tracking and search succeeds, the method further comprises:

calculating a second intersection over union between the second tracking-and-search box obtained by the successful single-target tracking and search and the respective box to be tracked of the second part unmatched with the main tracker in the second matching result;

comparing a maximum second intersection over union with a preset threshold of second intersection over union; and recognizing that the second tracking-and-search box is matched with the box to be tracked of the second part corresponding to the maximum second intersection over union, in response to that the maximum second intersection over union is greater than or equal to the threshold of second intersection over union.

9. The method according to claim 1, wherein in response to that the single-target tracking and search succeeds and the obtained second tracking-and-search box is matched with one box to be tracked of the second part unmatched with the main tracker in the second matching result, the method further comprises:

deleting the box to be tracked of the second part matched with the second tracking-and-search box, from the box to be tracked of the second part unmatched with the main tracker in the second matching result.

10. The method according to claim 1, wherein prior to the step of creating a single-target auxiliary tracker for the second main tracker, the method further comprises:

determining whether a total number of currently existing single-target auxiliary trackers reaches a threshold of maximum number;

performing the step of creating a single-target auxiliary tracker for the second main tracker, in response to that the total number of the currently existing single-target auxiliary trackers does not reach the threshold of maximum number; and recognizing that the target tracked by the second main tracker does not appear in the current frame, in response to that the total number of the single-target auxiliary trackers currently existing reaches the threshold of maximum number.

11. The method according to claim 1, wherein subsequent to the step of recognizing that the target tracked by the second main tracker does not appear in the current frame, the method further comprises:

determining whether the number of consecutive frames, where the target tracked by the second main tracker does not appear, reaches a preset threshold of number of frames; and deleting the second main tracker, in response to that the number of consecutive frames, where the target tracked by the second main tracker does not appear, reaches the preset threshold of number of frames.

12. The method according to claim 1, wherein the step of determining a target tracking result of the current frame according to the second matching result comprises:

detecting, according to the first matching result, whether the box to be tracked of the second part unmatched with the main tracker in the second matching result is the recognition box of the second part matched with the recognition box of the first part or the recognition box obtained from the recognition box of the first part unmatched with the recognition box of the second part by enlarging a box region thereof, in response to that the box to be tracked of the second part unmatched with the main tracker exists in the second matching result; and taking a recognized target of the box to be tracked of the second part as a third target to be tracked in the current frame, and creating a new identifier for the third target to be tracked, in response to that the box to be tracked of the second part unmatched with the main tracker in the second matching result is the recognition box of the second part matched with the recognition box of the first part or the recognition box obtained from the recognition box of the first part unmatched with the recognition box of the second part by enlarging a box region thereof, wherein subsequent to the step of creating a new identifier for the third target to be tracked, the method further comprises:

creating a third main tracker for the third target to be tracked.

13. The method according to claim 1, wherein prior to the step of performing a first part recognition and a second part recognition in a current frame, the method further comprises:

training a first part recognition model for performing the first part recognition and a second part recognition model for performing the second part recognition, based on a Faster Region-based Convolutional Neural Network (RCNN) algorithm; and the step of performing a first part recognition and a second part recognition in a current frame comprises:

performing the first part recognition on the current frame with the first part recognition model, and performing the second part recognition on the current frame with the second part recognition model.

14. The method according to claim 1, wherein the step of performing a matching between the at least one recognition box of the first part and the at least one recognition box of the second part comprises:

calculating a third intersection over union between each of the at least one recognition box of the first part and every one of the at least one recognition box of the second part; and performing a matching between the recognition box of the first part and the recognition box of the second part with a preset matching algorithm, according to the third intersection over union between each of the at least one recognition box of the first part and every one of the at least one recognition box of the second part.

15. The method according to claim 14, wherein the preset matching algorithm comprises a maximum weight bipartite graph matching algorithm, and prior to the step of performing a matching between the at least one recognition box of the first part and the at least one recognition box of the second part with the maximum weight bipartite graph matching algorithm, the method further comprises:

resetting the calculated third intersection over union less than a threshold of third intersection over union to 0;

or, subsequent to the step of performing a matching between the at least one recognition box of the first part and the at least one recognition box of the second part with the maximum weight bipartite graph matching algorithm, the method further comprises:

canceling a match between the recognition box of the first part and the recognition box of the second part, which have the third intersection over union less than the preset threshold of third intersection over union, in a matching result obtained after performing the matching processing with the maximum weight bipartite graph matching algorithm.

16. The method according to claim 1, wherein the step of performing a matching operation on a respective box to be tracked of the second part in the current frame, based on a first multi-target tracking model of a previous frame, comprises:

predicting a prediction box of the tracked target in the current frame according to the main tracker, for the main tracker of each target to be tracked in the previous frame, and performing a matching operation between the prediction box and the respective box to be tracked of the second part.

17. An electronic device, comprising:

one or more processors; and a memory for storing one or more programs which, when being executed by the one or more processors, cause the one or more processors to implement the method of tracking a target according to claim 1.

18. A system for tracking a target, wherein the target has a second part comprising a first part and a part other than the first part, and the system comprises:

a recognition module, configured to perform a first part recognition and a second part recognition in a current frame, to obtain at least one recognition box of the first part and at least one recognition box of the second part, respectively;

a determination module for a box to be tracked, configured to perform a matching between the at least one recognition box of the first part and the at least one recognition box of the second part, to obtain a first matching result, and determine a box to be tracked of the second part of a recognized target in the current frame, according to the first matching result, wherein the box to be tracked of the second part of the recognized target in the current frame comprises the at least one recognition box of the second part and a recognition box obtained from the recognition box of the first part unmatched with the recognition box of the second part, by enlarging a box region of the recognition box of the first part unmatched with the recognition box of the second part; and a tracking result determination module, configured to perform a matching operation on a respective box to be tracked of the second part in the current frame, based on a first multi-target tracking model of a previous frame, to obtain a second matching result, and determine a target tracking result of the current frame according to the second matching result, wherein the first multi-target tracking model of the previous frame comprises main trackers of a plurality of targets to be tracked in the previous frame, wherein the tracking result determination module is configured to:

detect whether the box to be tracked of the second part unmatched with the main tracker exists in the second matching result, in response to that the second matching result comprises a second main tracker unmatched with the box to be tracked of the second part; and recognize that the target tracked by the second main tracker does not appear in the current frame, in response to that the box to be tracked of the second part unmatched with the main tracker does not exist in the second matching result, wherein the tracking result determination module is further configured to:

detect whether the second main tracker carries a single-target auxiliary tracker, in response to that the box to be tracked of the second part unmatched with the main tracker exists in the second matching result;

create a single-target auxiliary tracker for the second main tracker, according to the box to be tracked of the second part of the target tracked by the second main tracker in the previous frame, and perform a single-target tracking and search in the current frame with the single-target auxiliary tracker carried by the second main tracker, in response to that the second main tracker does not carry the single-target auxiliary tracker; and take a recognized target of the box to be tracked of the second part matched with the second tracking-and-search box as a second target to be tracked in the current frame, and set an identifier of the second target to be tracked to be an identifier of the target tracked by the second main tracker followed by the single-target auxiliary tracker obtaining the matched second tracking-and-search box, in response to that the single-target tracking and search succeeds and the obtained second tracking-and-search box is matched with one box to be tracked of the second part unmatched with the main tracker in the second matching result.

* * * * *